United States Patent
Thomas et al.

(10) Patent No.: US 6,511,094 B2
(45) Date of Patent: Jan. 28, 2003

(54) AUTOMOTIVE VEHICLE AIR BAG SYSTEM

(75) Inventors: Scott David Thomas, Novi, MI (US); Michael John Wolanin, Hartland, MI (US); Daniel Patrick Faust, Howell, MI (US); Darrell O. Rogers, Rochester, MI (US)

(73) Assignee: General Motors Corporation, Detroit, MI (US)

( * ) Notice: Subject to any disclaimer, the term of this patent is extended or adjusted under 35 U.S.C. 154(b) by 123 days.

(21) Appl. No.: 09/817,767

(22) Filed: Mar. 26, 2001

(65) Prior Publication Data

US 2001/0035637 A1 Nov. 1, 2001

Related U.S. Application Data

(60) Provisional application No. 60/192,290, filed on Mar. 27, 2000, and provisional application No. 60/196,547, filed on Apr. 11, 2000.

(51) Int. Cl.⁷ .............................................. B60R 21/16
(52) U.S. Cl. .................... 280/743.2; 280/736; 280/742
(58) Field of Search ............................. 280/728.1, 733, 280/734, 742; 286/743.2, 736

(56) References Cited

U.S. PATENT DOCUMENTS

| | | | | |
|---|---|---|---|---|
| 5,242,193 A | * | 9/1993 | Humpal .......................... | 222/3 |
| 5,489,119 A | * | 2/1996 | Prescaro et al. ......... | 280/730.1 |
| 5,511,820 A | * | 4/1996 | Hatfield .................... | 280/728.1 |
| 5,562,367 A | * | 10/1996 | Scott ........................... | 406/112 |
| 5,570,905 A | * | 11/1996 | Dyer ........................ | 280/743.1 |
| 5,695,214 A | | 12/1997 | Faigle et al. ................ | 280/735 |
| 5,887,894 A | | 3/1999 | Castagner et al. ....... | 280/743.2 |
| 6,189,916 B1 | * | 2/2001 | Bowers et al. ........... | 280/728.2 |
| 6,237,943 B1 | * | 5/2001 | Brown et al. ............ | 280/728.2 |
| 6,334,627 B1 | * | 1/2002 | Heym et al. ............. | 280/728.1 |
| 6,419,268 B1 | * | 7/2002 | Webert .................... | 280/730.2 |
| 6,431,583 B1 | * | 8/2002 | Schneider ................ | 280/728.2 |
| 6,431,599 B1 | * | 8/2002 | Bohn ...................... | 280/743.1 |

FOREIGN PATENT DOCUMENTS

GB 2265118 * 3/1993 .............. 280/743.2

OTHER PUBLICATIONS

USSN 09/817,784 filed Mar. 26, 2001, "Automotive Vehicle Air Bag System".

* cited by examiner

*Primary Examiner*—Paul N. Dickson
*Assistant Examiner*—Toan C To
(74) *Attorney, Agent, or Firm*—Laura C. Hargitt

(57) ABSTRACT

An air bag system for an automotive vehicle is disclosed. The air bag system includes a housing substantially enclosing a gas emitting inflator and a compact undeployed air bag. The system further includes a moveable member that controls flow of gas into the air bag by controlling items such as tether elements and venting openings that, in turn, control the amount of gas released into the bag and the shape of the bag upon deployment.

34 Claims, 22 Drawing Sheets

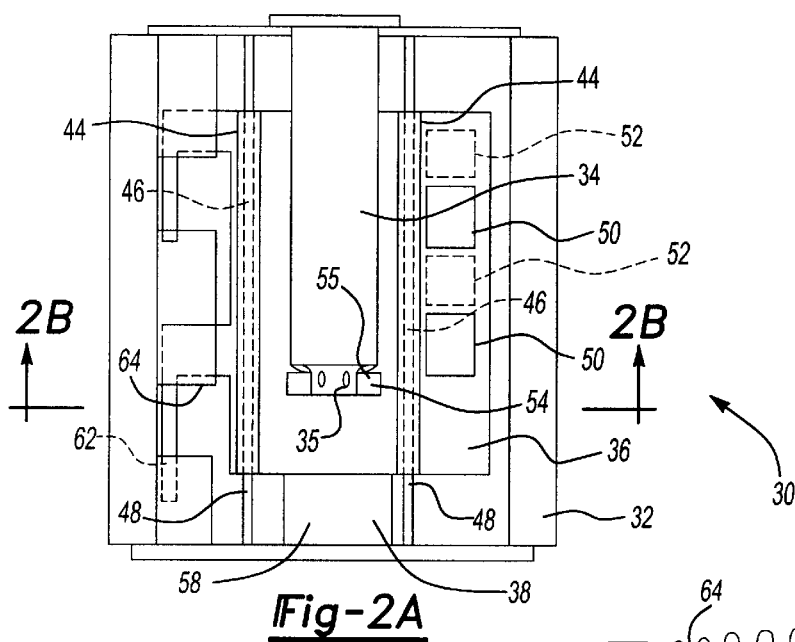
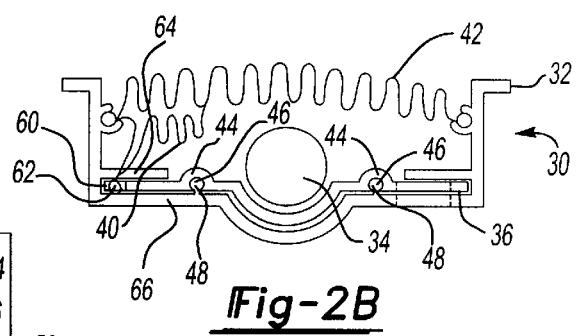
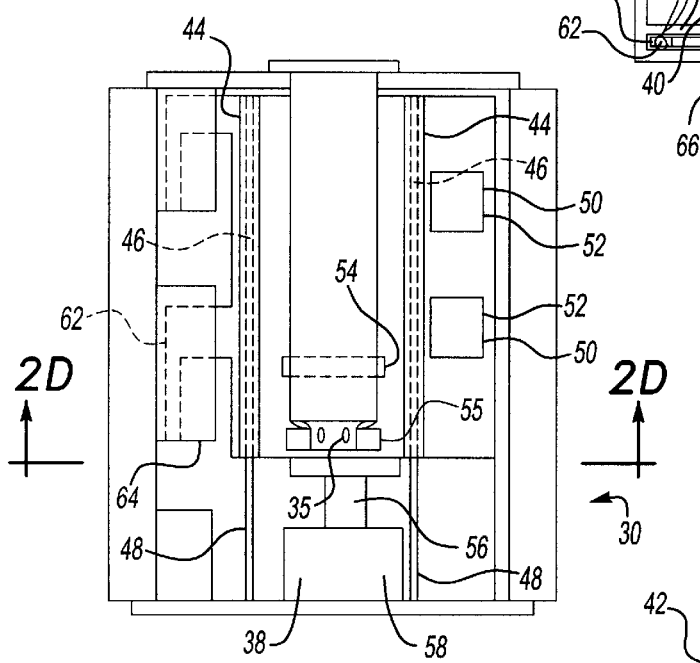
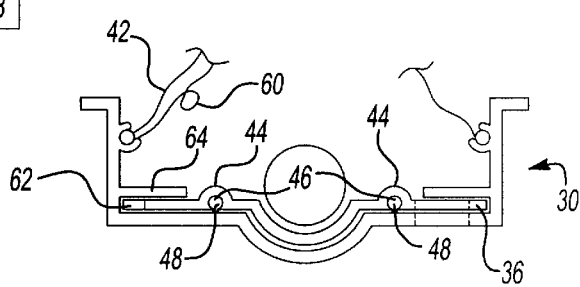

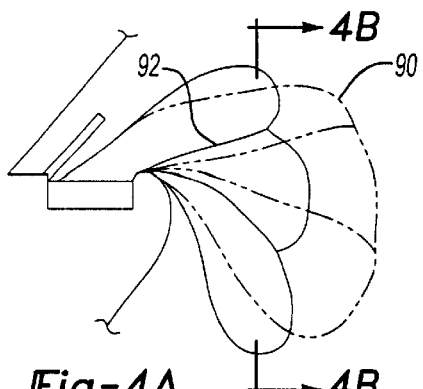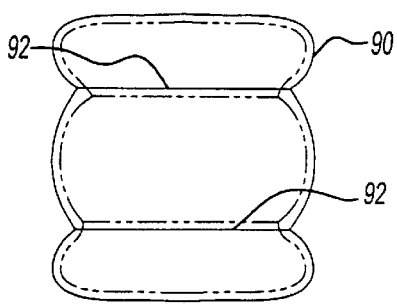
Fig-4A  Fig-4B
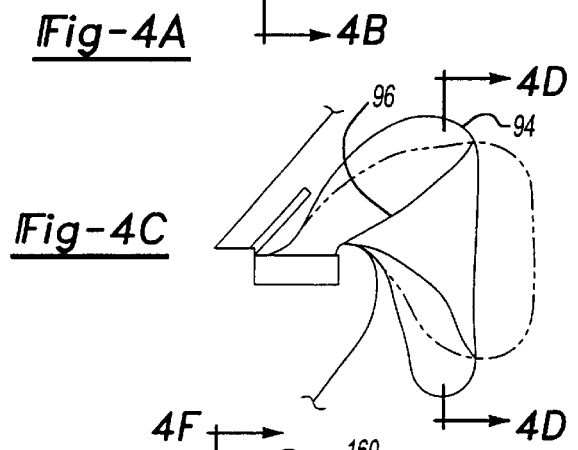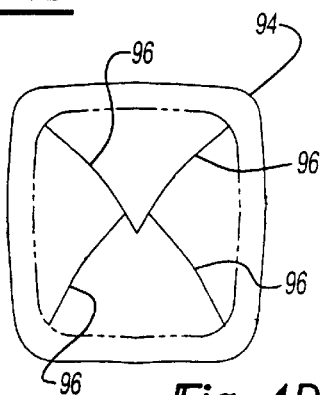
Fig-4C  Fig-4D
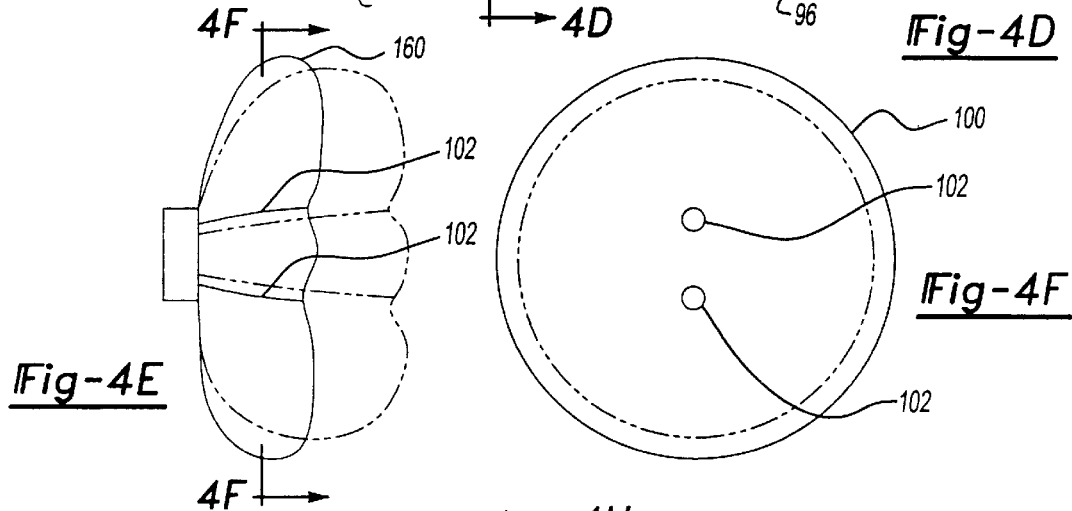
Fig-4E  Fig-4F
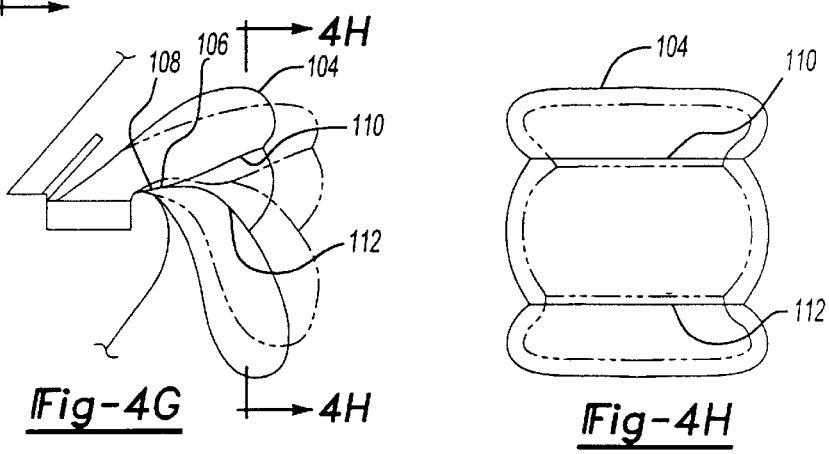
Fig-4G  Fig-4H

ATTACHED TETHER
ELEMENT STATE

DETACHED TETHER
ELEMENT STATE

ATTACHED TETHER
ELEMENT STATE

DETACHED TETHER
ELEMENT STATE

POTENTIAL ASSEMBLY SEQUENCE

ATTACHED TETHER
ELEMENT STATE

DETACHED TETHER
ELEMENT STATE

ATTACHED TETHER
ELEMENT STATE

DETACHED TETHER
ELEMENT STATE

POTENTIAL ASSEMBLY SEQUENCE

ATTACHED TETHER
ELEMENT STATE

DETACHED TETHER
ELEMENT STATE

POTENTIAL ASSEMBLY SEQUENCE

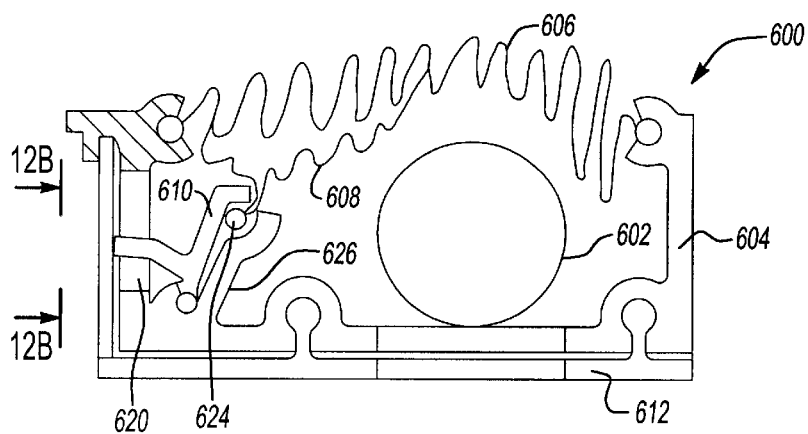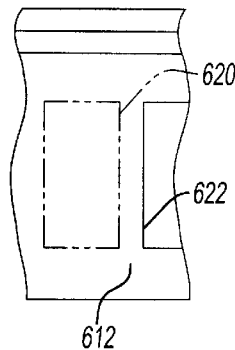
Fig-12A　　　　Fig-12B
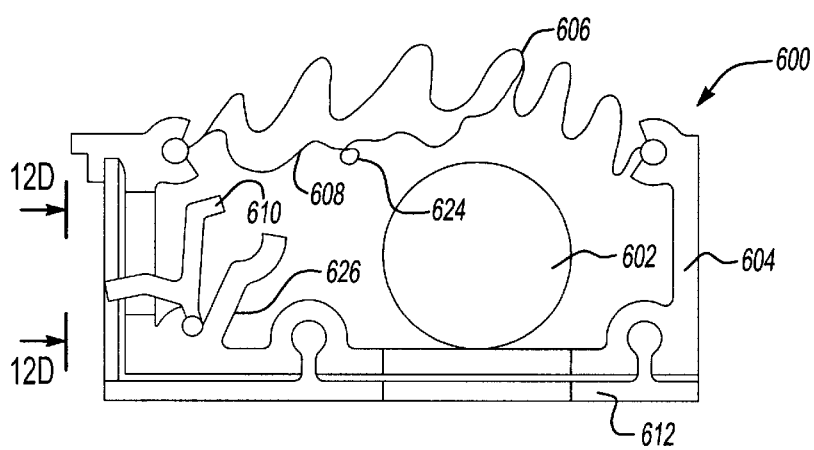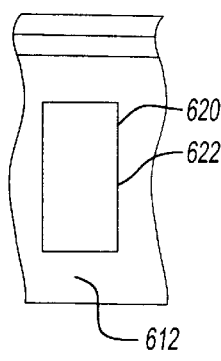
Fig-12C　　　　Fig-12D
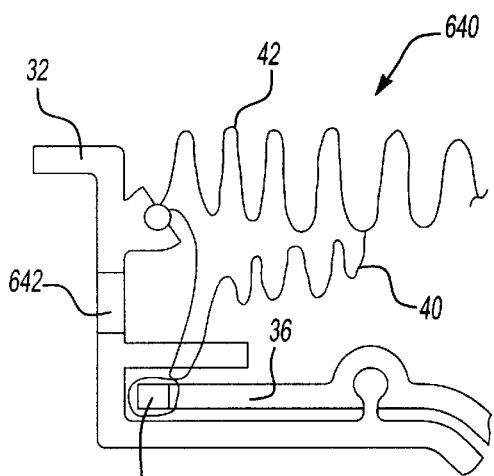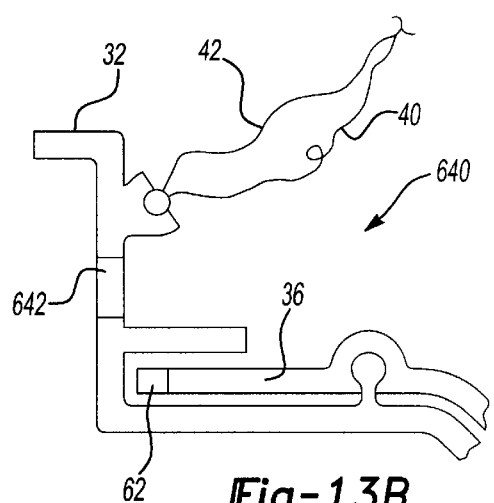
Fig-13A　　　　Fig-13B

AUTOMOTIVE VEHICLE AIR BAG SYSTEM The present application claims benefit of Provisional Application No. 60/192,290 filed Mar. 27, 2000, and Provisional Application No. 60/196,547 filed Apr. 11, 2000, both hereby expressly incorporated by reference.

TECHNICAL FIELD

The present invention relates to an automotive vehicle air bag system having controlled deployment.

BACKGROUND OF THE INVENTION

Air bag systems in automotive vehicles generally include an air bag that is designed to deploy toward a seat of the automotive vehicle when triggered by a sensor signal. For example, air bag systems might be deployed upon sudden deceleration of a vehicle or upon impact of the vehicle with another object. The art continues to investigate alternative ways to deploy air bags. For example, accelerometers have been investigated to determine when a sensor should signal the deployment of an air bag. Inflator assemblies have also been developed to control how much gas is emitted into an air bag upon deployment.

SUMMARY OF THE INVENTION

The present invention is premised upon yet another alternative way to deploy air bags, which involves controlling the manner of deployment of an air bag.

Accordingly, there is disclosed an air bag system having a gas emitting inflator for emitting inflation gas. The inflator is in signaling communication with a device for sensing a first predetermined condition. An air bag is in fluid communication with the inflator for receiving the inflation gas from the inflator to inflate the air bag to a deployed state upon the occurrence of the first predetermined condition. A housing surrounds the air bag and the inflator prior to inflation of the air bag and the air bag includes a vent opening. A profile restraining element is attached to a portion of the air bag. A moveable member is moveable from a first position to a second position. The moveable member includes an opening in alignment with the vent opening of the housing when the moveable member is in its first position and out of alignment when the moveable member is in its second position. An actuator is in signaling communication with a second sensing device. The actuator is capable of selectively actuating the moveable member from the first position to the second position. The second sensing device is capable of sending signals to the actuator to assist in determining when the actuator actuates the moveable member based upon a second predetermined condition.

In one preferred embodiment, the air bag system includes a release mechanism having a rotatable member supported by the moveable member prior to actuation of the member wherein the rotatable member rotates to release a tether element upon actuation of the moveable member.

In another preferred embodiment, the air bag system includes a scraper and the housing includes a rod. A tether element is releasable from the rod by the scraper upon actuation of the moveable member.

In still another preferred embodiment, the air bag system includes a gas director attached to the moveable member adjacent the opening of the member, the gas director guiding gas from the inflator through the opening in the moveable member and the vent opening in the housing when the moveable member is in a position selected from the first and second position.

Accordingly, whether or not employed in combination with one or more additional alternative ways to deploy air bags, the present invention offers air bag system designers additional flexibility in designing air bag systems for placement in any of a number of locations within an automotive vehicle and for different vehicle designs.

These and other objects, aspects, and advantages of the present invention will become apparent upon reading the detailed description in conjunction with the accompanying drawings.

BRIEF DESCRIPTION OF THE DRAWINGS

FIG. 2(a) is a top cut away view of a portion of an air bag system having a moveable member in a first position.

FIG. 2(b) is a sectional view of the air bag system of FIG. 2(a) taken along line 2B—2B.

FIG. 2(c) is a top cut away view of a portion of the air bag system of FIGS. 2(a)–2(b) having the moveable member in a second position.

FIG. 2(d) is a sectional view of the air bag system of FIG. 2(c) taken along line 2D—2D.

FIG. 4(a) is a sectional side view of an air bag system with an air bag and a pair of selectively releasable tether elements in a released and unreleased state.

FIG. 4(b) is a sectional view of the air bag and tether elements of FIG. 4(a) taken along line 4B—4B.

FIG. 4(c) is a sectional side view of an air bag system with an air bag and selectively releasable tether elements in a released and unreleased state.

FIG. 4(d) is a sectional view of the air bag and tether elements of FIG. 4(c) taken along line 4D—4D.

FIG. 4(e) is a sectional side view of an air bag system with an air bag and a pair of selectively releasable tether elements in a released and unreleased state.

FIG. 4(f) is a sectional view of the air bag and tether elements of FIG. 4(e) taken along line 4F—4F.

FIG. 4(g) is a sectional side view of an air bag system with an air bag and a selectively releasable tether element in a released and unreleased state.

FIG. 4(h) is a sectional view of the air bag and tether element of FIG. 4(g) taken along line 4H—4H.

FIG. 11 (a) illustrates a sectional view of a portion of the tether element of FIG. 11 taken along line 11A—11A.

FIGS. 12(a)–12(b) respectively illustrate a sectional view of an air bag system having a moveable member, an opening and a tether element release mechanism and a side view of the opening prior to actuation of the moveable member.

FIGS. 12(c)–12(d) respectively illustrate a sectional view of an air bag system having a moveable member, an opening and a tether element release mechanism and a side view of the opening after actuation of the moveable member.

FIGS. 13(a)–13(b) illustrate a portion of the air bag system of FIGS. 2(a)–2(b) with an opening added.

DESCRIPTION OF THE PREFERRED EMBODIMENT

The present invention is premised upon the employment in an air bag system of a moveable member for assisting in 1) selectively retaining or releasing a tether element 2) selectively opening or closing openings or 3) directing gas flow within a system being deployed. The invention is at least partially based upon advances over copending application Ser. No. 09/672,409 filed Sep. 28, 2000 and entitled, "Variable Profile Air Bag Restraint", which is herein expressly incorporated by reference, and is related to commonly owned copending application entitled "Automotive Air Bag System", attorney docket No. GP-301115, filed on the same date as the present application, which is also herein expressly incorporated by reference.

Figure 1A:
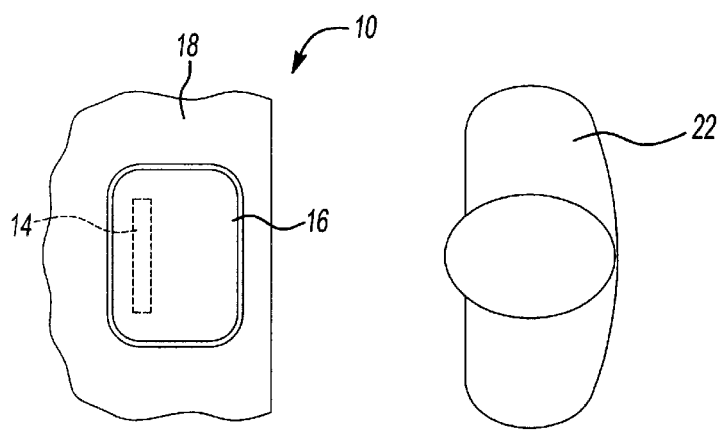
FIGS. 1(a)–1(c) are top views of an air bag system as an air bag is deployed from the system.
Figure 1B:
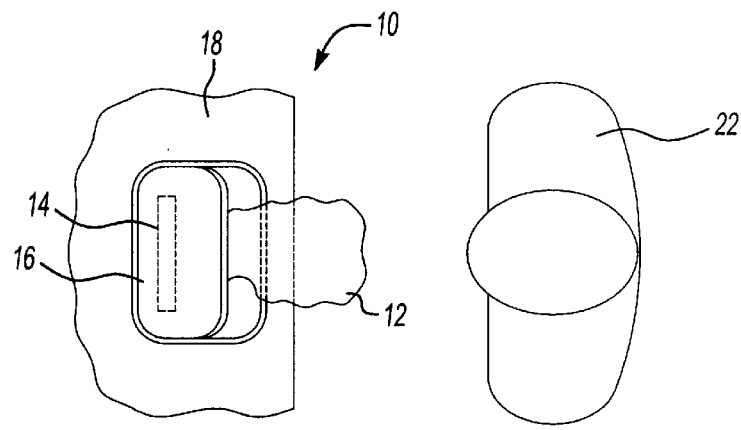
Figure 1C:
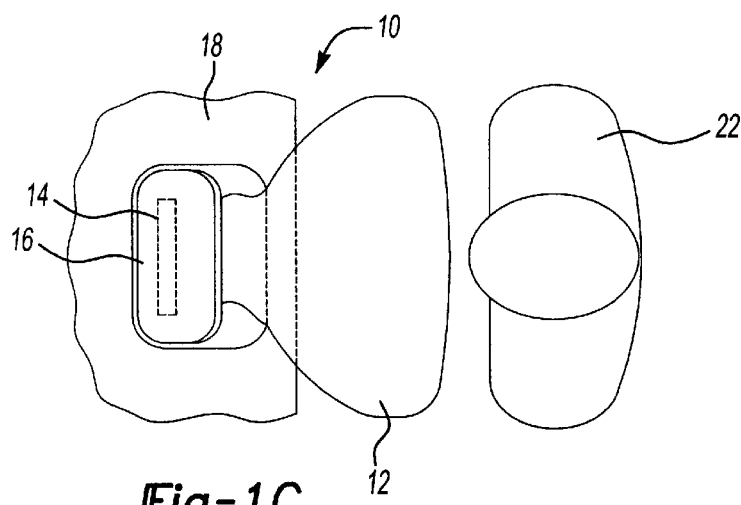

Referring to FIGS. 1(a)–1(c), an air bag system 10 generally includes an inflatable air bag 12, and a gas emitting inflator 14 for emitting gas into the air bag upon a signal from a triggering sensor (not shown). A housing stores the air bag prior to deployment. A deployment door 16, typically exposed to passenger view, covers the housing and opens to allow the deployment of the air bag 12. In FIG. 1(a), the air bag 12 is in a non-deployed state and is therefore disposed behind the deployment door 16 that is mounted within or upon a dashboard 18 or other interior structure of an automotive vehicle. In FIGS. 1(b) and 1(c), the air bag 12 is shown both during deployment of the bag 12 toward an individual 22 and is shown fully deployed.

The gas emitting inflator 14 is in signaling communication with a triggering sensor (not shown) for sensing a first predetermined condition such as a vehicle impact, extreme deceleration or the like. The gas emitting inflator 14 includes a canister or other suitable container adapted for containing a gas source and one or more outlets for emitting gas liberated from the source into the air bag 12 upon deployment. Thus, the container 14 may contain compressed gas to be emitted into the bag, solid propellant that ignites thereby producing gas to be emitted into the bag, or a combination upon the occurrence of the predetermined condition sensed by the sensor.

The air bag 12 of the system is formed of conventional woven air bag materials such as nylon, polyester or the like, which optionally are selectively coated to with a suitable coating (e.g. silicone based) over at least a portion of its surfaces for selectively controlling density and porosity of the bag 12, and thus the release of gas from within the bag 12 during and after deployment. As will be appreciated from the discussion herein, the use of selective coatings may be substituted or used in combination with other techniques disclosed for varying the rigidity of the air bag and its rate of deployment of the air bag Moveable Member In a first preferred aspect of the present invention, the amount of gas released into the air bag, the shape of the air bag upon deployment or both are at least partially controlled by a moveable member proximate the gas emitting inflator. The moveable member may assist in selectively inhibiting or promoting the release of gas from a gas emitting inflator into an air bag. Alternatively or in addition, the moveable member may be releasably attached to a tether element or operate another member that is releasably attached to a tether element. By retaining or releasing the tether element, the moveable member assists in controlling the shape of the air bag and controlling the distance away from the gas emitting inflator that the air bag travels upon deployment or both.

Referring now to FIGS. 2(a) through 2(d), there is illustrated an air bag system 30 including a housing 32 at least partially surrounding a gas emitting inflator 34 with gas emitting openings 35, a moveable member 36, an actuator 38, an air bag restraining tether element 40 and an air bag 42.

The moveable member 36, which in this example is a plate, is disposed between the gas emitting inflator 34 and the housing 32. The member 36 includes elongated protrusions 44 that define channels 46 and the housing 42 includes rails 48 that may be slidably disposed within the channels 46 of the member 36. The member 36 and the housing 32 respectively include low pressure venting openings 50, 52. The member 36 and the housing 32 also respectively include high pressure venting openings 54, 55 directly adjacent the gas emitting openings 35, the gas emitting inflator 34. The member 36 and the housing 32 are high strength to weight materials, such as steel, aluminum or plastic composites.

The actuator 38 includes a plunger 56 and a housing 58 surrounding a suitable device such as a motor or pneumatic arm (not shown) for linearly actuating the plunger 56 out of the housing 58. In FIGS. 2(a)–2(d), the housing 58, preferably, surrounds a pyrotechnic device (not shown) such as propellant which may be conventionally ignited to create pressure in the housing thereby actuating the plunger 56 out of the housing 58 upon deployment of the air bag 42. Preferably, the actuator 38 is communicatively connected with a suitable sensor (e.g. the air bag deployment sensor, another different sensor, or both) that sends a signal to activate the pyrotechnic device within the housing 58 upon detecting a triggering condition such as a vehicle impact.

The housing 58 may also include a suitable stopper (not shown) for preventing the plunger 56 from retracting once it is extended. It be recognized that there exist many known and commercially available sensor systems that may be used with the present invention.

The tether element 40 of the system 30 is attached to a portion of the air bag 42 and an attachment such as loop 60 of the tether element 40 is disposed about a pin 62 of the moveable member 36. The tether element 40 may be any suitable material, including that used to form the air bag 42.

In general, the tether elements of the present invention are flexible wires, cords, ropes or webs that typically are attached at one end to an air bag and have a free second end for releasable attachment to a portion of the air bag housing, such as an attachment pin, arm, hook or the like (referred to herein generically as a pin). The free end of the tether element thus has a looped or sleeved attachment configuration (referred to herein as a loop.) The tether element thus provides at least a temporary resistance on an air bag being deployed to restrain the profile of the bag as the bag extends outwardly away from the gas emitting inflator. As will be seen herein the location of the tether element and its mechanisms of release advantageously permit control over the sequence of air bag inflation or its direction of inflation.

In operation, the actuator 38 receives a signal from a sensor or sensor system and, depending upon the signal received, the actuator 38 may selectively actuate (e.g., translate) the member 36 along the rails 48 between a first position (e.g. prior to actuation) which is shown in FIGS. 2(a) and 2(b) and a second position, e.g. the position shown in FIGS. 2(c) and 2(d). In the first position, the high pressure vent openings 54, 55 are aligned and the low pressure vent openings 50, 52 are out of alignment.

If the signal from the sensor system does not signal the actuation of the moveable member 36, the tether element 40 remains looped about the pin 62 such that the tether element 40 can at least partially restrain the inflation of the bag 42. Further, the high pressure vent openings 54, 55 remain aligned to purge a substantial amount of gas that would normally enter the air bag 42.

If the member 36 is actuated, the member 36 translates between positions and the pin 62 of the member 36 slides between a flange 64 of the housing 32 and a back wall 66 of the housing 42 such that the loop 60 of the tether element 40 is slid off the pin 62 by the flange 64 thereby releasing the tether element 40. The high pressure openings 54, 55 are moved out of alignment to close the openings 54, 55 and prohibit any substantial venting through the openings 54, 55. The low pressure vents openings 50, 52 align to provide ride-down venting or venting after the air bag 42 has been substantially inflated. By actuating the member 36 to release the tether element 40 and close openings 54, 55, the air bag 42 becomes more substantially inflated than if the member 36 is not deployed. Thus, the one or more sensors in communication with the actuator 38 are preferably programmed to signal actuation of the moveable member 36 when these nonsense a predetermined condition appropriate for relatively unrestrained air bag 42 deployment and do not signal actuation when the sensors sense a predetermined condition appropriate for a more restrained deployment. Exemplary conditions sensed by the sensors may include vehicle occupant positioning, degree of vehicle impact, location of vehicle impact and the like. It may also be the case that the moveable 36 is automatically actuated upon deployment of the air bag 42 unless a sensor sends a signal stopping such automatic actuation.

Tether Element Systems

Figure 3A:
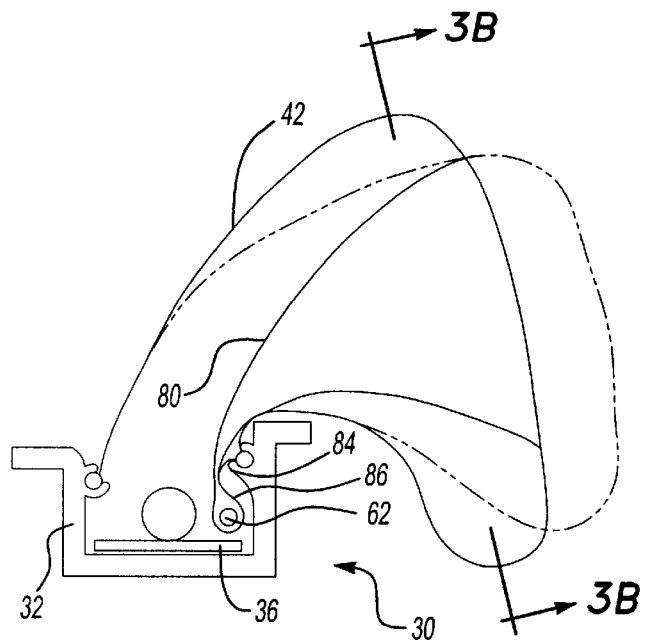
FIG. 3(a) is a side sectional view of an air bag system with an air bag having a selectively releasable tether element in an unreleased state.
Figure 3B:
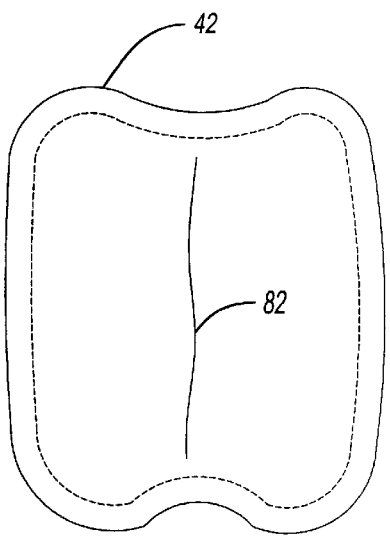
FIG. 3(b) is a sectional view of the air bag and tether element of FIG. 3(a) taken along line 3B—3B.
Figure 3C:
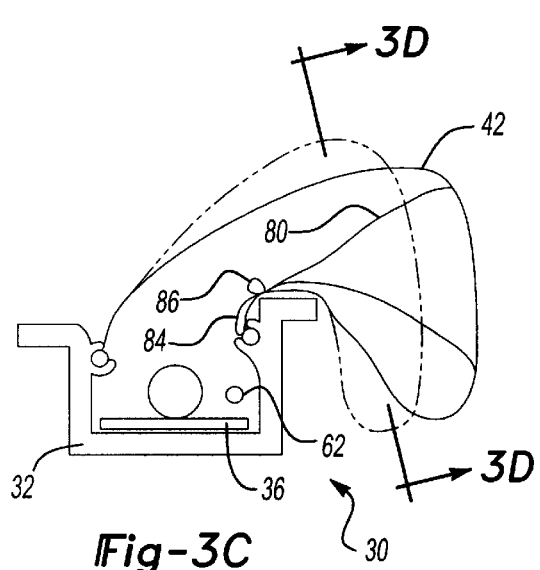
FIG. 3(c) is a side sectional view of the air bag system of FIG. 3(a) with the selectively releasable tether element in a released state.
Figure 3D:
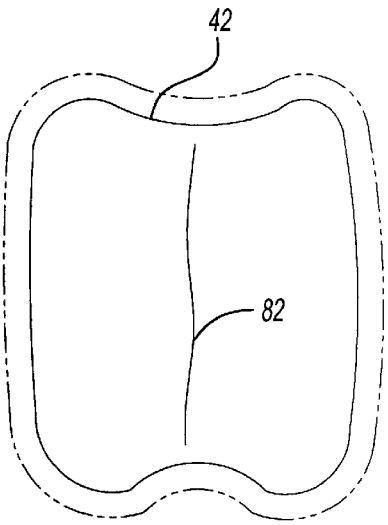
FIG. 3(d) is a sectional view of the air bag and tether element of FIG. 3(a) taken along line 3D—3D.

Tether elements, advantageously are employed for controlling direction as of air bag deployment by restraining one portion of the air bag resistive to another portion of the system. Referring to FIGS. 3(a) through 3(d), there is illustrated one type of air bag restraining tether element 80 for use in the air bag system 30. An edge 82 of the tether element 80 is attached in an elongated manner to a portion of the bag 42. A portion 84 of the tether element 80 opposite the edge 82 is attached to the housing 32 of the air bag system 30. An attachment 86 of the tether element 80 is looped about to the pin 62 of the member 36 between the edge 82 and portion 84 of the tether element 80. The tether element 80 has a triangular panel structure when the air bag 42 is inflated as shown in FIGS. 3(a) and 3(c).

In operation, the loop 86 of the tether element 80 is releasably attached to the pin 62 as in FIGS. 2(a)–2(d). If the tether element 80 remains attached to the pin 62, the tether element 80 remains relatively short and restrains the portion of the air bag 42 that is attached to the edge 82 of the tether element 80, thereby causing a wider deployment of the air bag 42 or air bag profile that is restrained as the air bag 42 deploys toward a vehicle seat as relatively shown in solid lines in FIGS. 3(a)–3(b) and phantom lines in FIGS. 3(c)–3(d). If the tether element 80 is allowed to release from the pin 62, the tether element 80 becomes longer and applies a relatively lower level of restraint upon the portion of the air bag 42 attached to the edge 82 of the tether element 80 thereby allowing a more elongated deployment of the air bag 42, resulting in an air bag profile that is less restrained as the air bag 42 deploys toward a vehicle seat as relatively shown in phantom lines in FIGS. 3(a)–3(b) and solid lines in FIGS. 3(a)–3(d).

Referring to FIGS. 4(a)–4(h), alternative embodiments of potential tether elements are disclosed. Each of the tether elements includes a device for releasable attachment of the tether element to a moveable plate. Each of the air bags is shown with its respective tether element in a restrained state as depicted by solid lines, and in the released state as depicted by phantom lines.

In FIGS. 4(a)–4(b) there is illustrated an air bag 90 that includes a pair of spaced apart tether elements 92 that are substantially similar to the lone tether element 80 of FIGS. 3(a)–3(d) with the exception that tether elements 92 are oriented horizontally rather than vertically.

In FIGS. 4(c)–4(d), there is illustrated an air bag 94 that includes two vertical panel tether elements 96 that are generally triangular and each includes an is elongated edge 98 attached to the air bag 94.

In FIGS. 4(e)–4(f), there is illustrated an air bag 100 having a pair of rope tether elements 102 that are attached to central portions of the air bag thereby restraining the central portions upon deployment.

In FIGS. 4(g)–4(h), there is illustrated another air bag 104 having a tether element 106 including a first portion 108 that separates into a second and third portion 110, 112, that are attached to the air bag 104.

As demonstrated by the above, the various tether elements of the present invention may be selectively restrained or released in a variety of manners. Referring to FIGS. 5(a)–5(f), there are disclosed a variety of release mechanisms that operate in conjunction with a moveable member (i.e. translatable into and out of the page in the depictions of FIGS. 5(a)–5(f)) to selectively restrain or release the tether elements or the air bags of an air bag system.

Figure 5A:
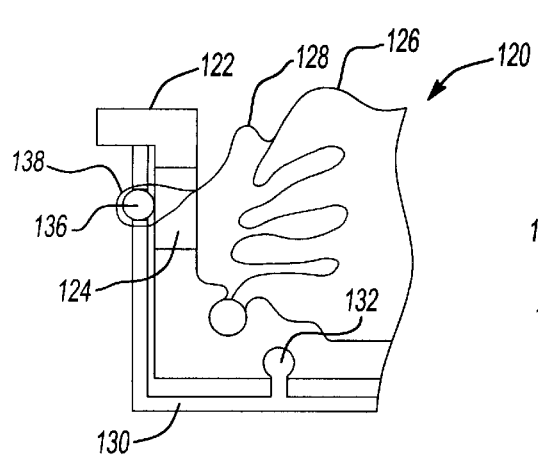
FIGS. 5(a)–5(b) are sectional views of a portion of an air bag system having an air bag and a selectively releasable tether element respectively in a released and unreleased state.
Figure 5B:
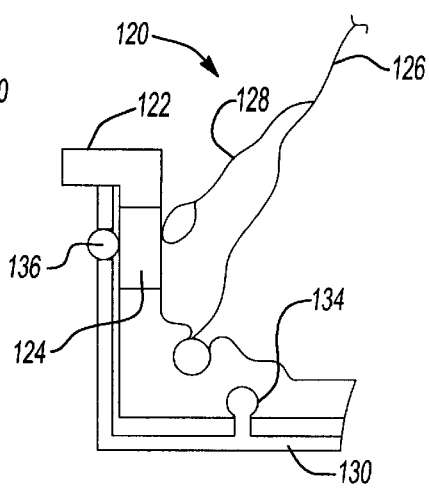

In FIGS. 5(a)–5(b), there is illustrated a portion of an air bag system 120 having a housing 122 with a opening 124, an air bag 126, a tether element 128 and a moveable member 130. The member 130 is exterior of the housing 122 and includes one or more guide rails 132 that are disposed within one or more channels 134 of the housing 122 for translatably attaching the member 130 to the housing 122. The member 130 further includes a pin 136 located adjacent the opening 124 prior to deployment of the member 130. The tether element 128 is located outside of the interior of the air bag 126 and is directly attached to the bag 126. The tether element 106 includes a loop 138. Upon deployment of the air bag 126, the member 130 may or may not be actuated. If the member 130 is actuated, the movable member 130 is translated such that the loop 138 of the tether element 128 is slid off the pin 136 by a wall of the opening 124 as the pin 136 is moved away from the opening 124 thereby releasing the tether element 128.

Figure 5C:
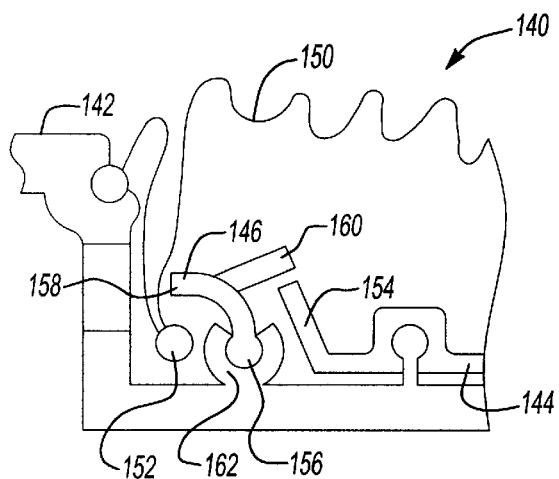
FIGS. 5(c)–5(d) are sectional views of a portion of an air bag system having an air bag with a selectively releasable portion respectively in a released and unreleased state.
Figure 5D:
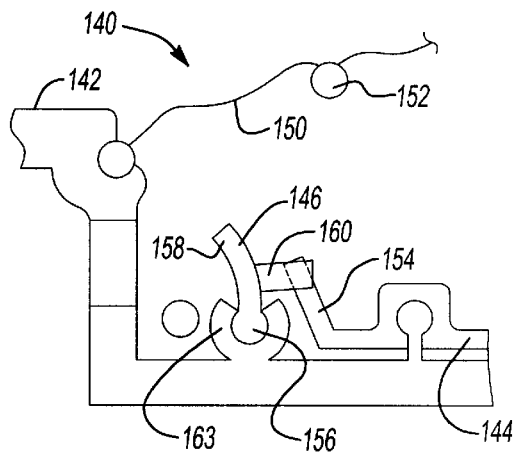

In FIGS. 5(c)–5(d), there is illustrated an air bag system 140 having a housing 142, a moveable member 144, a release mechanism having a retention member 146 and an air bag 150 with a rod 152 attached thereto. The moveable member 144 is substantially identical to the member 36 of FIGS. 2(a)–2(h) with the exception that the member 144 includes a flange 154 extending at an angle away from the moveable member 144. The retention member 146 includes a cylindrical portion 156, an arcuate member 158 for constraining the rod 152, and a flange 160 extending from the arcuate member 158. The cylindrical portion 156 of the retention member 146 is rotatably disposed within a socket portion 162 of the housing 142. Prior to actuation of the moveable member 144, the flange 154 of the moveable member 144 is in a detent position relative to the flange 160 of the retention member 146 for restricting rotation of the retention member 146.

Upon actuation of the moveable member 144, the flange 154 of the member 144 is moved from the detent position to a position allowing free rotation of the flange 160. In this manner, the arcuate portion 158 can be rotated about the cylindrical portion 156 to release the rod 152, and thereby release the air bag 150.

Figure 5E:
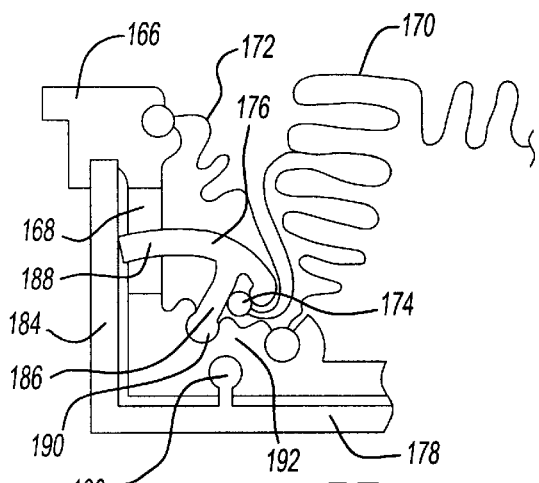
FIGS. 5(e)–5(f) are sectional views of a portion of an air bag system having an air bag and a selectively releasable tether element respectively in a released and unreleased state.
Figure 5F:
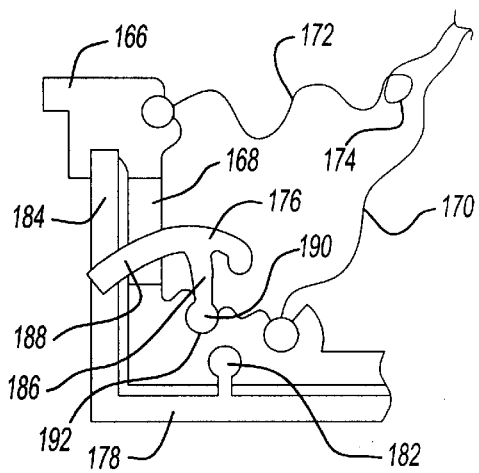
Figure 6:
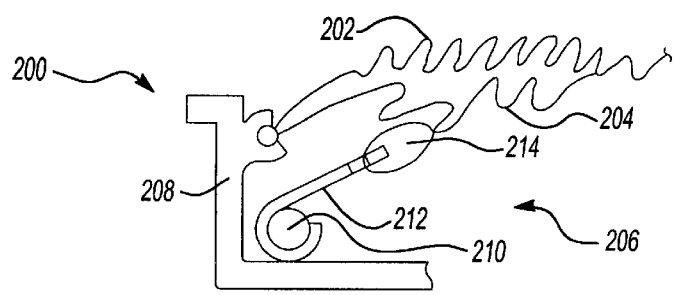
FIGS. 6 is a cross sectional view of another airbag system with a ring type release mechanism for selectively releasing a tether element of the system.
Figure 6A:
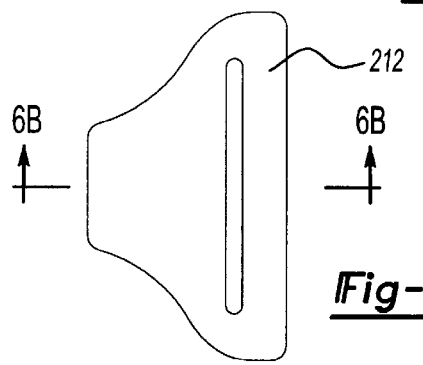
FIGS. 6(a)–6(b) respectively illustrate a top and sectional view of a ring type release mechanism for use in the air bag system of FIG. 6.
Figure 6B:
Figure 6C:
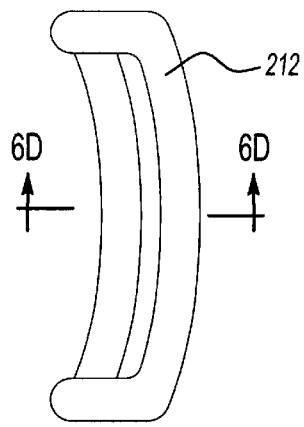
FIGS. 6(c)–6(d) respectively illustrate a top and sectional view of a ring type release mechanism for use in the air bag system of FIG. 6.
Figure 6D:
Figure 6E:
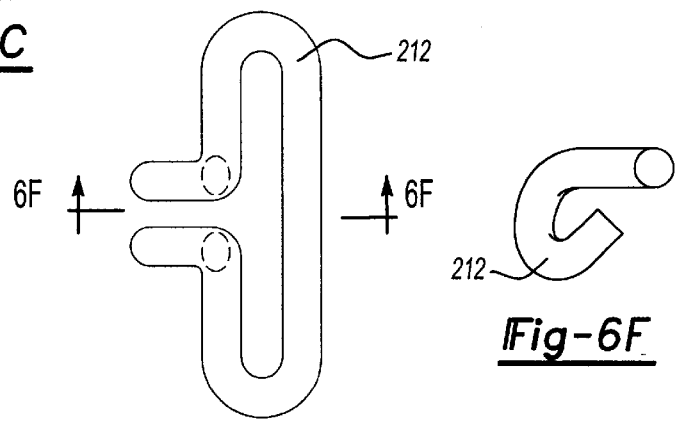
FIGS. 6(e)–6(f) respectively illustrate a top and sectional view of a ring type release mechanism for use in the air bag system of FIG. 6.
Figure 6F:
Figure 7A:
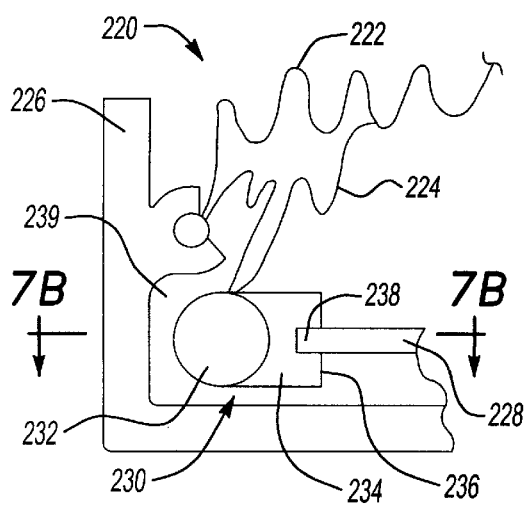
FIGS. 7(a)–7(b) respectively illustrated a side sectional view and a top cut away view of a portion of an air bag system having an air bag, a selectively releasable tether element prior to release and a moveable member.
Figure 7B:
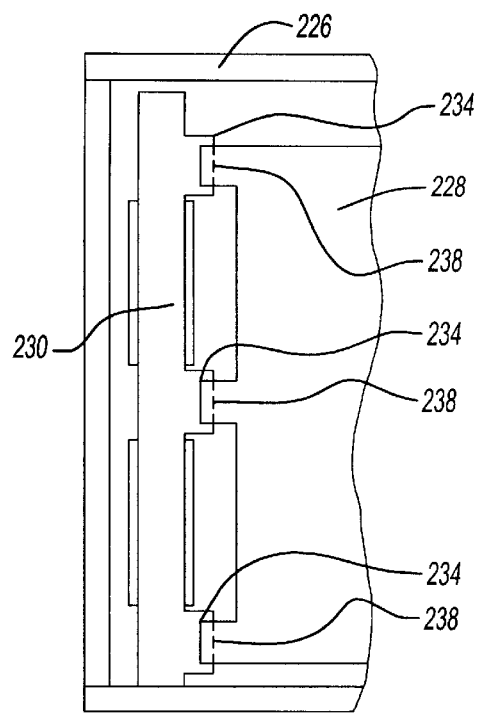
Figure 7C:
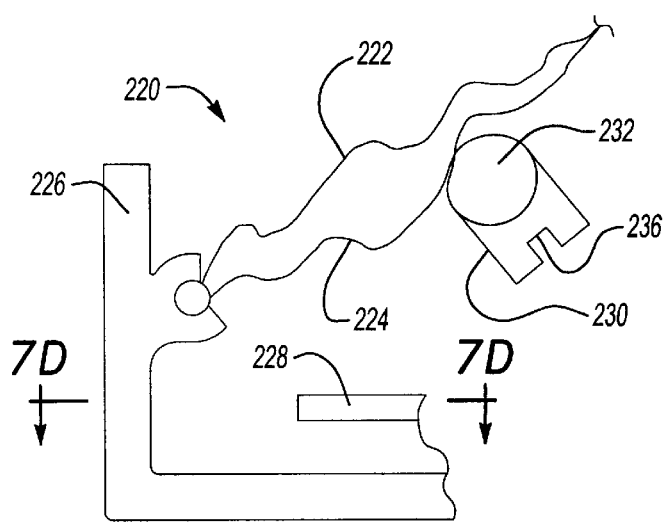
FIGS. 7(c)–7(d) respectively illustrate the air bag system of FIGS. 7(a)7(b), wherein the moveable member has been actuated and the tether element released.
Figure 7D:
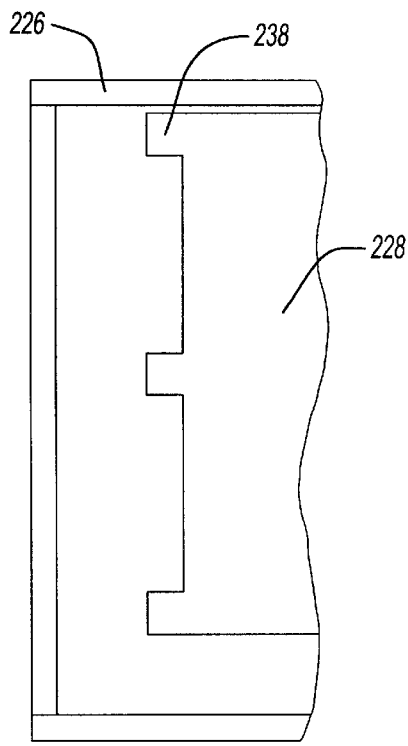

In FIGS. 5(e) and 5(f), there is illustrated a portion of an air bag assembly having a housing 166 with an opening 168, an air bag 170, a tether element 172 with a pin 174 a release mechanism with a rotatable arm 176 and a moveable member 178. The moveable member 178 is exterior of the housing 166 and includes at least one guide rails 180 disposed within a channel 182 of the housing 166. The moveable member 178 includes a wall 184 for selectively opening the opening 168. The wall extends only partially over the distance that the moveable member 178 may move upon actuation. The rotatable arm 176 includes a first portion 186 attached to an arcuate portion 188, which extends through the opening 168 into abutting contact with the wall 184 of the member 178. The first portion 186 includes a cylindrical portion 190 in a socket portion 192 of the housing 166 for rotation of the rotatable member 176 about the cylindrical portion 190.

Upon actuation of the moveable member 178, the wall 184 is displaced relative to the arcuate portion 188 of the rotatable arm 176, until the wall no longer contacts the arm 176. In this manner, the arm 176 becomes free to rotate in the socket portion 192. Upon such rotation, the rotatable member 176 releases the pin 174 and the tether element 172.

Referring to FIGS. 6, 6(a)–6(f), there is illustrated an air bag system 200 having an air bag 202, a tether element 204, a release mechanism 206 for selectively releasing the tether element 204 and housing 208. The release mechanism 206 includes a pin 210 of a moveable member (not shown) and a ring member 212. The ring member 212 may be any of those shown in FIGS. 6(a)–6(f).

Prior to deployment of the air bag 200, the ring member 212 surrounds the pin 210 and a loop 214 of the tether element 204 surrounds a portion of the ring member 213. Upon deployment, the moveable member pulls the pin 210 out of the ring member 212 releasing the member 212 and the tether element 204.

Referring to FIGS. 7(a)–7(d), there is illustrated an air bag system 220 having an air bag 222, a tether element 224, a housing 226, a moveable member 228 and a release mechanism 230. The release mechanism 230 includes a rod 232 attached to the tether element 224. The rod 232 has a plurality of gripping members 234 extending therefrom. Each of the gripping members 234 includes a channel 236. The moveable member 228 includes a plurality of protrusions 238.

Prior to actuation, the protrusions 238 of the moveable member 228 are disposed in the channels 236 of the gripping members 234 of the release mechanism 230 thereby securing the rod 232 and therefore a portion of the tether element 224 within a channel 239 of the housing 226. Upon actuation, the moveable member 228 is displaced such that the protrusions 238 of the moveable member 228 exit the channels 236 of the gripping members 234 thereby releasing the rod 236 and the tether element 224.

Figure 8A:
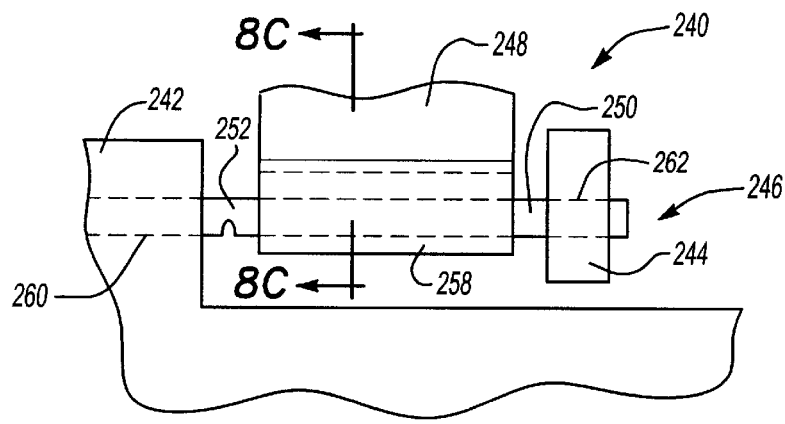
FIGS. 8(a)–8(b) are side views of a tether element release mechanism respectively retaining and releasing a tether element.
Figure 8C:
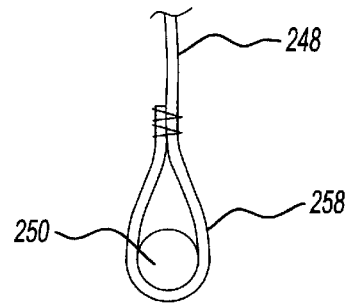
FIG. 8(c) is a sectional view of the tether element release mechanism taken along line 8C—8C.
Figure 8B:
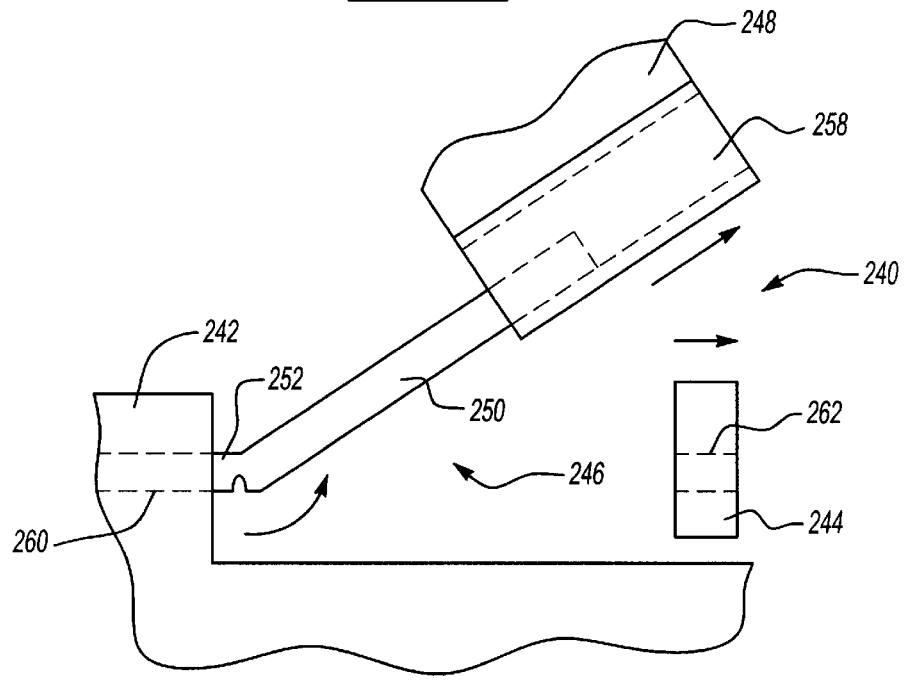
Figure 8D:
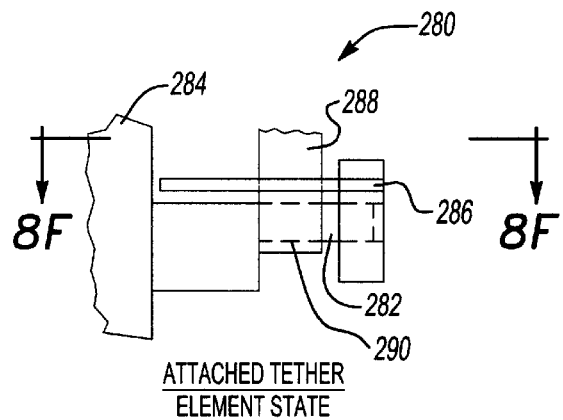
FIGS. 8(d)–8(e) illustrate side views of the operation of a tether element release mechanism.
Figure 8E:
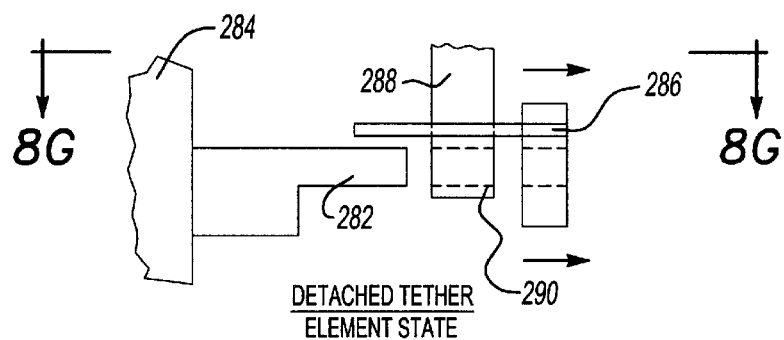
Figure 8F:
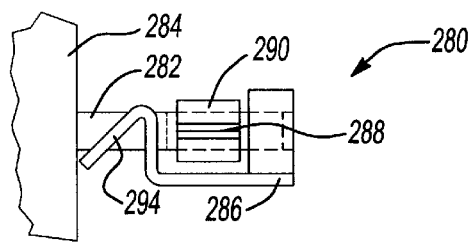
FIGS. 8(f)–8(g) respectively illustrate top views of the tether element release mechanism of FIGS. 8(d)–8(e) taken along lines 8F—8F and 8G–G.
Figure 8G:
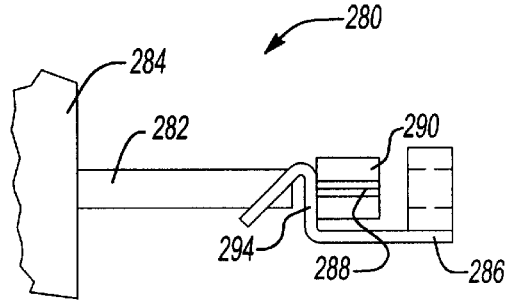
Figure 8H:
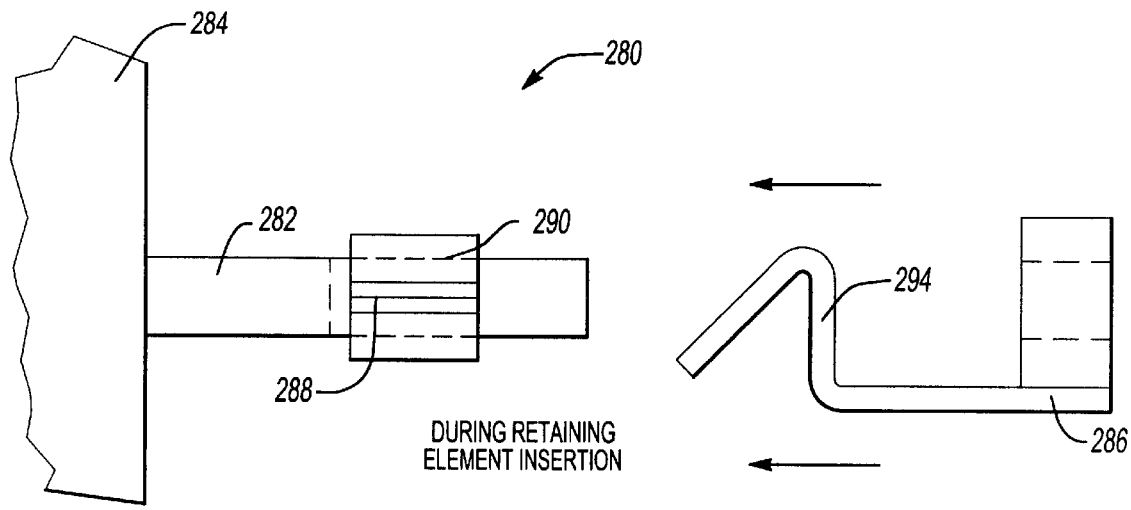
FIGS. 8(h)–8(i) illustrate top views of the tether element release mechanism of FIGS. 8(d)–8(e) during assembly.
Figure 8I:
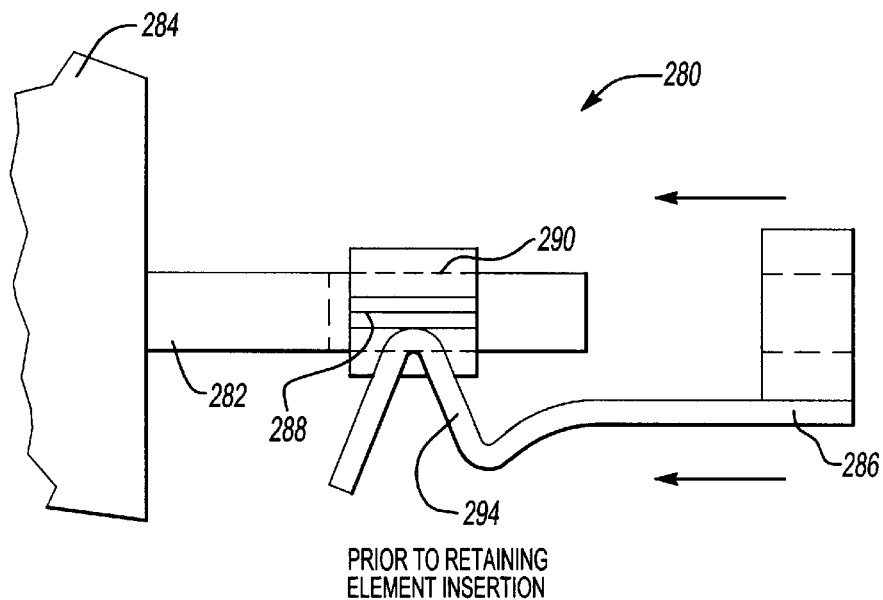
Figure 8J:
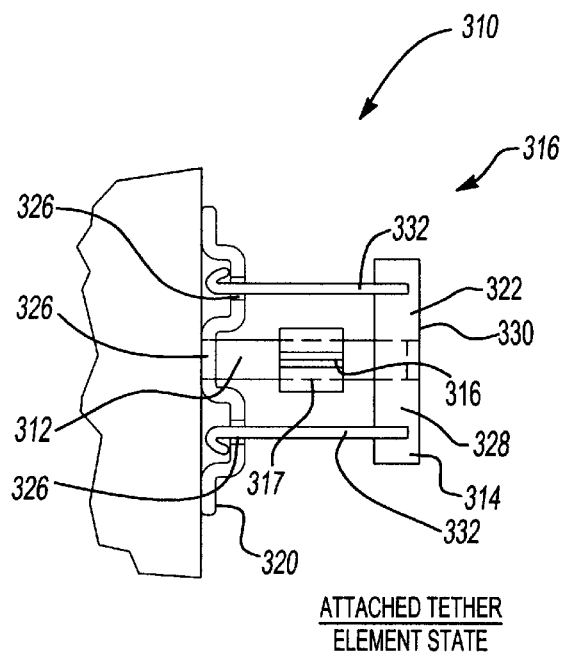
FIGS. 8(j)–8(k) illustrate top views of a tether element release mechanism during operation.
Figure 8K:
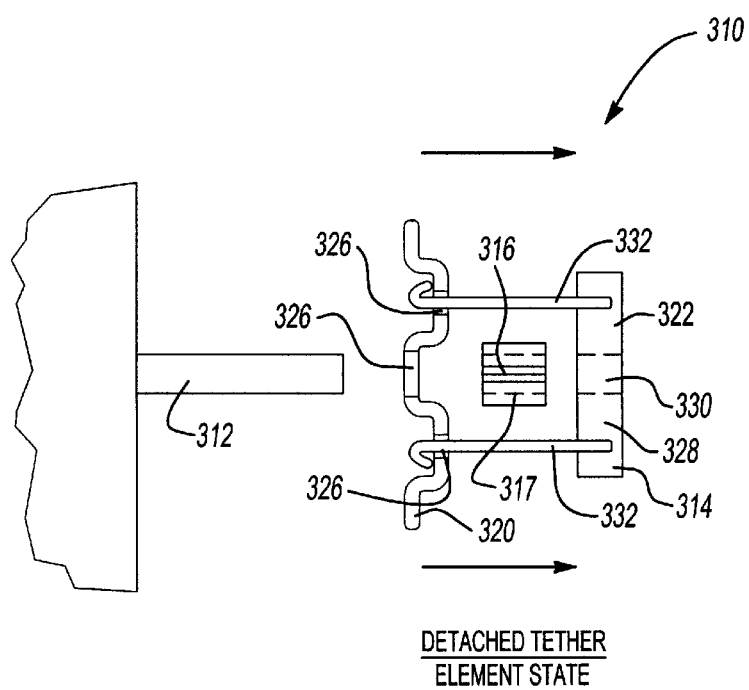
Figure 8L:
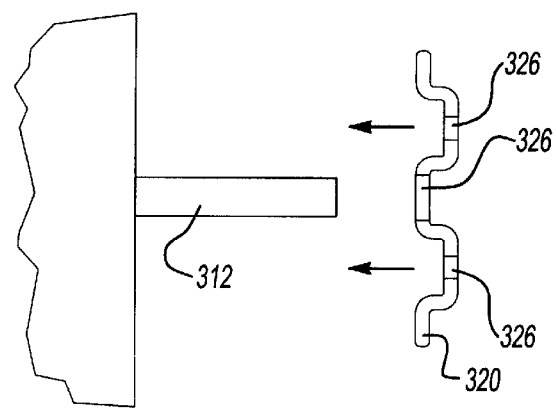
FIGS. 8(l)–8(n) illustrate top views of the tether element release mechanism during assembly.
Figure 8M:
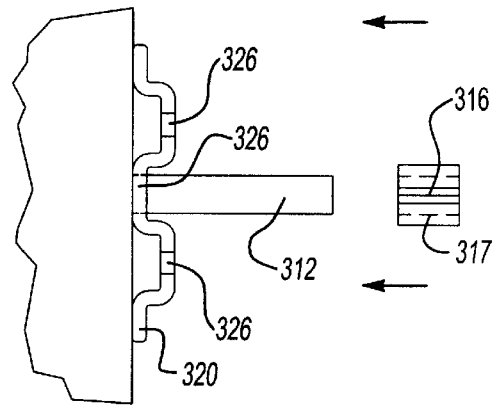
Figure 8N:
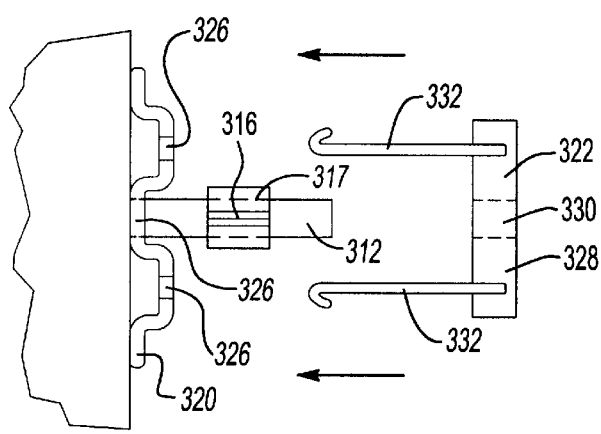

Referring to FIGS. 8(a)–8(c), there is illustrated an air bag system 240 having a housing 242, a moveable member 244, and a release mechanism 246 for releasing a tether element 248. The release mechanism 246 includes a rotatable pin 250 having a thinned or weakened portion 252 that the pin 250 may rotate about. The tether element 248 includes a loop 258, which may be looped about or secured to the pin 250. Prior to actuation, the pin 250 is secured within a cavity 260 of the housing 242 and within a cavity 262 of the moveable member 244 and the loop portion 258 of the tether element 248 is retained by the pin 250. Upon actuation, the moveable member 244 is displaced sufficiently to cause the pin 250 to become released from the cavity 262 of the moveable member 244. The pin 250 is then able to rotate about the thinned or weakened portion 252 of the pin 250, thereby releasing the loop portion 258 to release the tether element 248.

Referring to FIGS. 8(d)–8(o), there are illustrated alternative release mechanisms having a stationary pin, and a scraper that translated by the moveable members for releasing a tether element.

First, in FIGS. 8(d)–8(i), there is illustrated a portion of an air bag system 280 having a generally stationary pin 282 attached to a housing 284. A scraper 286 is attached to a moveable member (not shown) and a tether element 288 having a loop 290 for receiving the pin 282. The scraper 286 includes a portion 294 for displaceably engaging the loop 290 of the tether element 288. As shown best in FIGS. 8(h)–8(i), the portion 294 for displaceably engaging the loop 290 is flexible such that it may be moved past the tether element 288 and into position between the tether 288 and the housing 284. In operation, the loop 290 of the tether element 288 receives the pin 282 and the scraper member 286 is supported by the pin 282 as well. Upon deployment of an air bag, the moveable member translates the scraper member 286 and the portion 294 translates the loop 290 off of the pin 282 thereby releasing the tether element 288.

In other embodiments, the scraper may include multiple components. Referring to FIGS. 8(j)–8(n), there is illustrated a portion of an assembly 310 for an air bag system having a stationary pin 312. A scraper 314 is attached to a moveable member (not shown) and a tether element 316 having a loop 317 for receiving the pin 312. The scraper 314 includes a hook attachment having a first portion 320 and a second hooking portion 322. The first receiving portion 320 is generally elongated and includes a plurality of holes 326 for receiving the hooks 332 of the hooking portion 322. The second hooking portion 322 includes a generally annular ring 328 having a central hole 330. The assembly 310 is assembled by placing the first receiving portion 320 upon the pin 312 by slidably receiving the pin 312 within one of the holes 326 (e.g. in axial alignment with the central hole 330) of the first member 320. Thereafter, the loop 317 is looped about the pin 312. Finally, the central hole 330 of the second hooking portion 332 is slidably place on the pin 312, and the spaced hooks 332 are hooked into engagement with the first receiving portion 320.

Upon deployment of the moveable member, the scraper 314 is displaced away from the pin 312, causing the scraper to slide the tether element loop 316 from the pin 312. The spacing of the hooks 332 allows the loop of the tether element to become free and release the tether element 316. It also allows the tether element 316 to be assembled onto the pin before the hooks 332 are attached (see FIGS. 8L–8N).

Figure 8O:
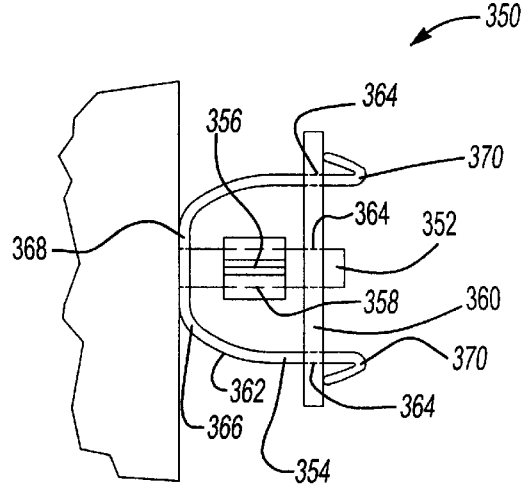
FIG. 8(o) illustrates a top view of another tether element release mechanism.

Referring to FIG. 8(o), there is illustrated a portion of an assembly 350 for an air bag system, the assembly 350 including a stationary pin 352, a scraper 354 attached to a moveable member (not shown) and a tether element 356 having a loop 358 for receiving the pin 352. The scraper 354 includes a first member 360 and a second member 362. The first member 360 is generally elongated and includes holes 364. The second member 362 includes a generally "U-shaped" portion 366 with a central hole 368 and a pair of hooking members 370. The assembly 350 is assembled by placing the second member 362 upon the pin 352 by slidably receiving the pin 352 within the central hole 368 of the second member 362. Thereafter, the loop 358 of the tether element 356 is looped about the pin 352. Finally, the central hole 364 of the first member 360 is slidably received by the pin 352 as the pair of hooking members 370 are fastened within the remaining two holes 364 of the first member 360. Upon deployment of the moveable member, the scraper member 354 is translated and the second member 362 translates the loop 358 of the tether element 356 from the pin 352 thereby releasing the tether element 356.

Figure 8P:
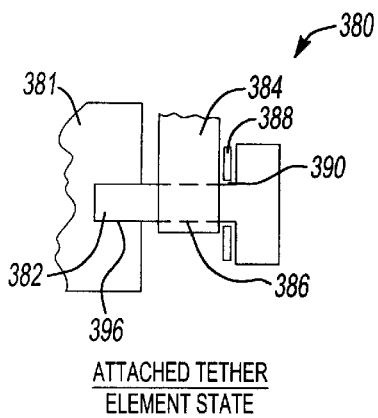
FIGS. 8(p)–8(q) illustrates side views of another tether element release mechanism during operation.
Figure 8Q:
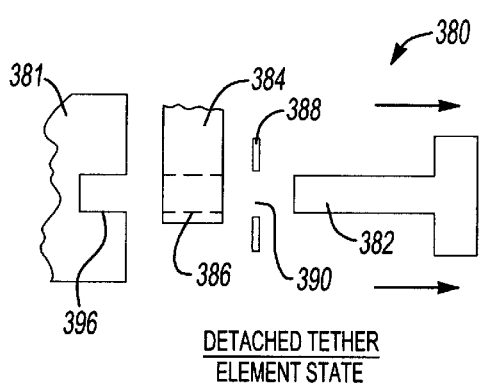
Figure 8R:
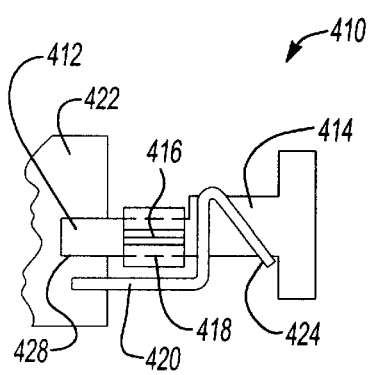
FIGS. 8(r)–8(s) illustrates top views of another tether element release mechanism during operation.
Figure 8S:
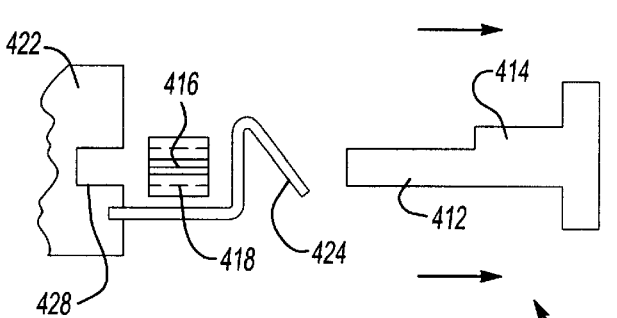

Referring to FIGS. 8(p)–(8z), there are illustrated release mechanisms with pins associated with moveable members. Referring specifically to FIGS. 8(p)–8(q), there is illustrated a portion of assembly 380 having a housing 381, a pin 382 attached to a moveable member (not shown), a tether element 384 having a loop 386 for receiving the pin 382 and a generally annular ring 388 mounted in a fixed position relative to the housing, and having a central hole 390 for receiving the pin 382. The assembly 380 is assembled by inserting the pin 382 in the hole 390 of the annular member 388 followed by inserting the pin 382 through the loop 386 of the tether element 384. Thereafter, the pin 382 is releasably mounted within a cavity 396 of the housing 381. Upon actuation, the moveable member translates the pin 382 away from the housing 50 the fixed annular ring 388 pushes the loop 386 of the tether element 384 from the pin 382 thereby releasing the tether element 384.

Figure 8T:
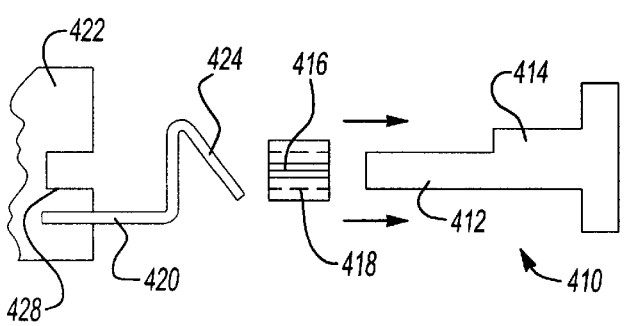
FIGS. 8(t)–8(u) illustrate top views of the tether element release mechanism of FIGS. 8(r)–8(s) during assembly.
Figure 8U:
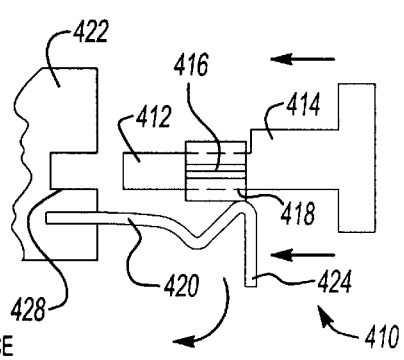
Figure 8V:
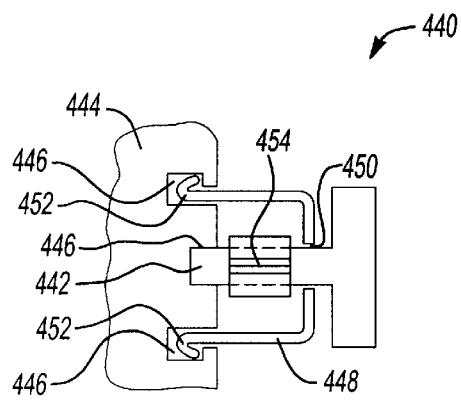
FIGS. 8(v)–8(w) illustrate top views of another tether element release mechanism during operation.
Figure 8W:
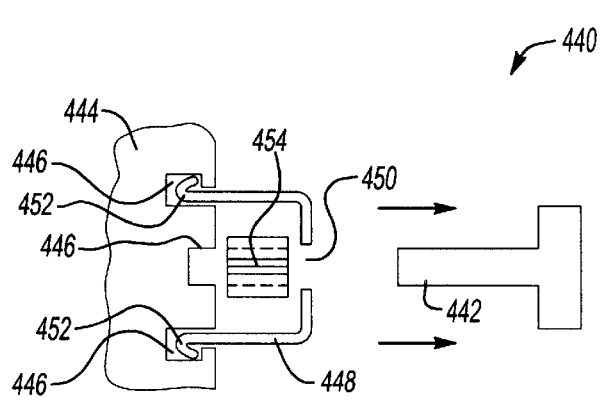
Figure 8X:
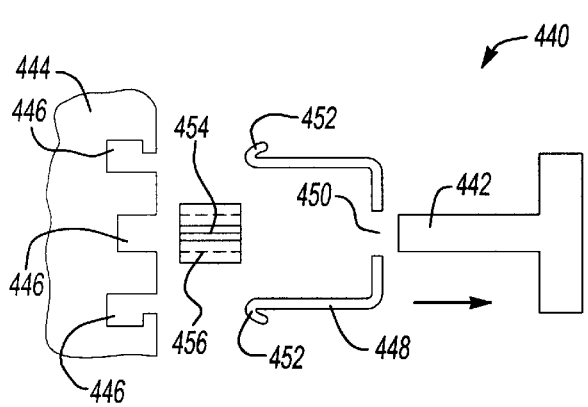
FIGS. 8(x)–8(z) illustrate top views of the tether element release mechanism of FIGS. 8(v)–8(w) during assembly.
Figure 8Y:
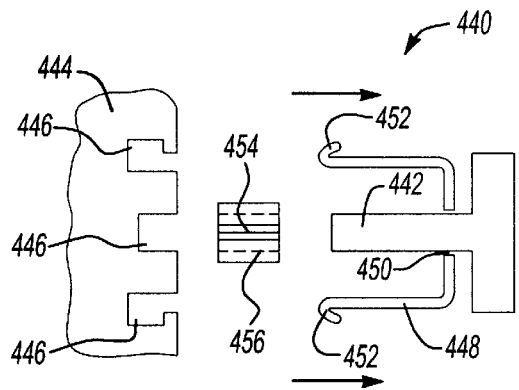
Figure 8Z:
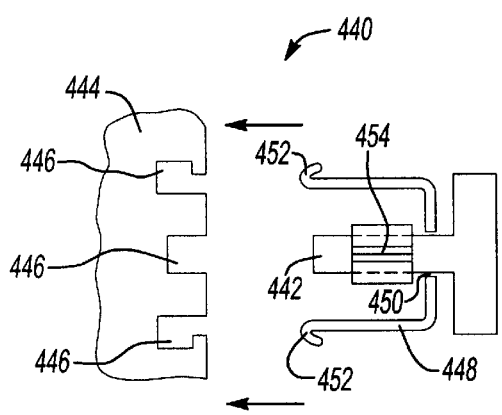

Referring to FIGS. 8(r)–8(u), there is illustrated another assembly 410 for an air bag system, the assembly 410 including a pin 412 with a stopper 414 attached to a moveable member (not shown), a tether element 416 having a loop 418 and a generally elongated flexible arm (e.g. a leaf spring) 420 attached to a housing 422 and having a detent portion 424. The assembly 410 is assembled by slidably receiving the loop 418 of the tether element 416 upon the pin 412 up to the stopper 414. Thereafter, the pin 412 is releasably mounted within a cavity 428 of the housing 422. Upon actuation, the moveable member moves away from the housing 422 and the pin 412 leaves the cavity 428 such that the detent portion 424 of the elongated flexible arm 420 pushes against the loop 418 of the tether element 416, causing it to slide from the pin 412, thereby releasing the tether element 416. The spring like structure of the flexible arm 420 allows the loop 418 to be slid over the pin 412 and the pin 412 to then be placed in the cavity 428 (as shown in FIGS. 8T–8U).

Referring to FIGS. 8(v)–8(z), there is illustrated another assembly 440 for an air bag system. The assembly includes a pin 442 attached to a moveable member (not shown), a housing 444 having a plurality of undercut cavities 446, a snap-in engagement member 448 having a central hole 450 and hooks 452, and a tether element 454 having a loop 456. The assembly 440 is assembled by receiving the pin 442 within the hole 450 of the member 448 and through the loop 456 of the tether element 454. Thereafter, the two hooking members 452 are received in the cavities 446 within the housing 444 while the pin 442 is releasably received in the third cavity 446 of the housing 444. Upon actuation, the pin 442 is translated out of the cavity 446 and the member 448 scrapes the loop 456 off the pin 442 thereby releasing the tether element 454.

Figure 9A:
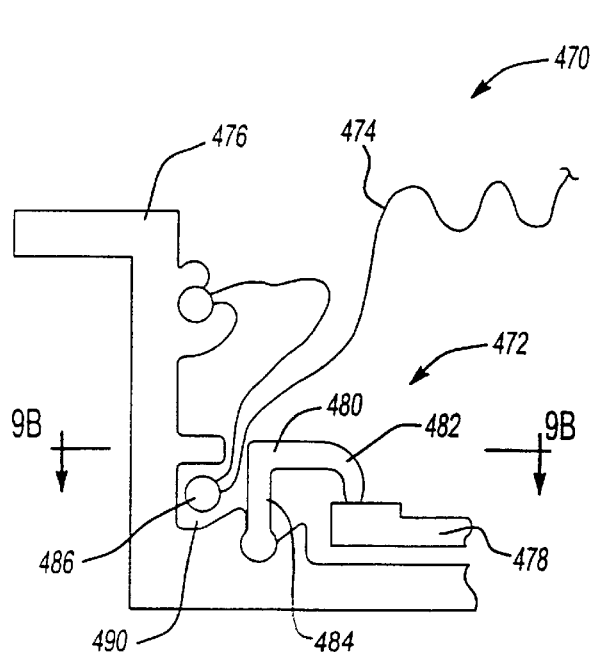
FIGS. 9(a)–9(b) respectively illustrate a sectional and a top cut away view of a tether element release mechanism prior to deployment.
Figure 9B:
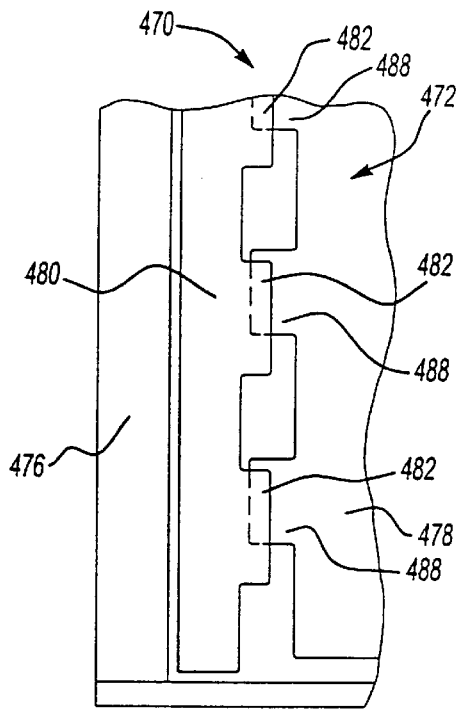
Figure 9C:
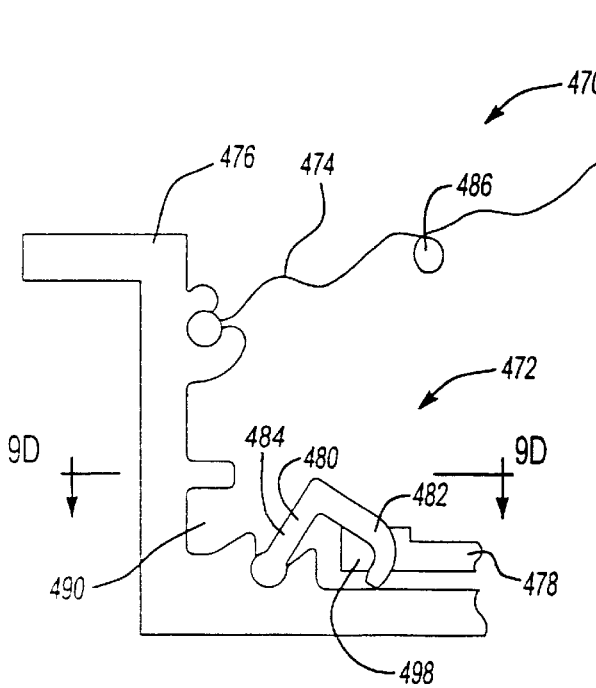
FIGS. 9(c)–9(d) respectively illustrate a sectional and a top cut away view of the tether element release mechanism of FIGS. 9(a)–9(b) after deployment.
Figure 9D:
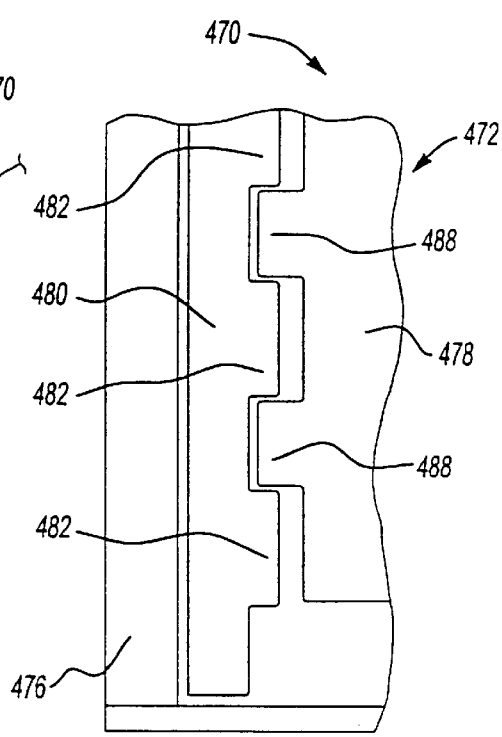

Referring to FIGS. 9(a)–9(d), there is illustrated another assembly 470 having a release mechanism 472 for releasing a tether element 474. The assembly includes a housing 476 and a moveable member 478. The release mechanism 472 includes a rotatable elongated panel 480 having one or more arms 482 extending at right angles from the panel 484, and a rod 486 attached to the tether element 474. The moveable member 478 includes projections 488 extending from a wall the moveable member 478. Prior to actuation, the projections 488 of the moveable member 478 blockingly engage the arms 482 of the elongated panel 480, and thus the panel 484 substantially encloses the rod 486 within a channel 490 of the housing 476. As seen in FIGS. 9C–9D, upon actuation, the member 478 is translated to release the arms 488 from blocking engagement thereby allowing the panel 484 to rotate and release the rod 486. In turn, the tether element 474 is released from the channel 490 of the housing 476.

Figure 10A:
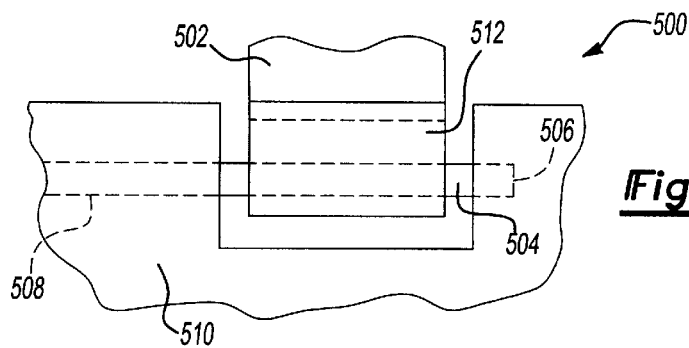
FIGS. 10(a)–10(b) illustrate another tether element release mechanism respectively prior to and after deployment.
Figure 10B:
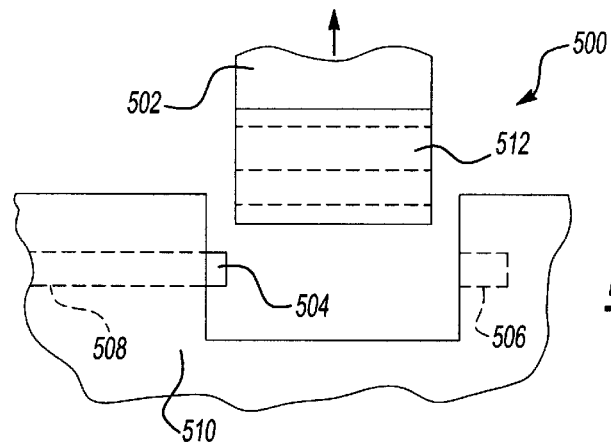

Referring to FIGS. 10(a)–10(b), there is illustrated a release mechanism 500 for a tether element 502 of an air bag system. The release mechanism 500 includes a retractable rod 504 that is part of, or attached to a moveable member (not shown). The rod 504 is disposed in opposing cavities or openings 506, 508 of a housing 510 of the air bag system. Upon deployment of the moveable member of the air bag system, the rod 504 retracts into the housing 510 thereby releasing a loop 512 of the tether element 502 disposed about the rod 504, thus, releasing the tether element 502 (see FIG. 10B).

Figure 10C:
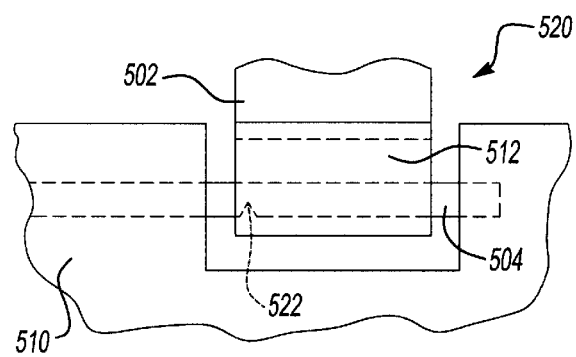
FIGS. 10(c)–10(d) illustrate another tether element release mechanism respectively prior to and after deployment.
Figure 10D:
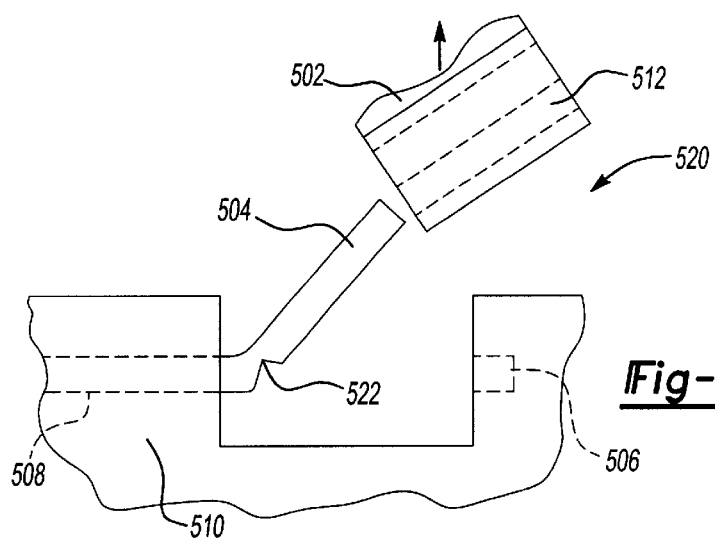

Referring to FIGS. 10(c)–10(d), there is illustrated another release mechanism 520 substantially identical to the release mechanism 500 of FIGS. 10(a)–10(b) with the exception that the rod 504 includes a substantially thinned or hinged portion 522 about which a portion of the rod 504 is rotatable. Upon deployment of an air bag of the system the rod 504 retracts a distance far enough to remove the rod 504 from one of the opposing cavities 506, 508 such that the rod 504 can rotate about the thinned or hinged portion and release the loop 512 of the tether element 502 and thus release the tether element 502.

Figure 11:
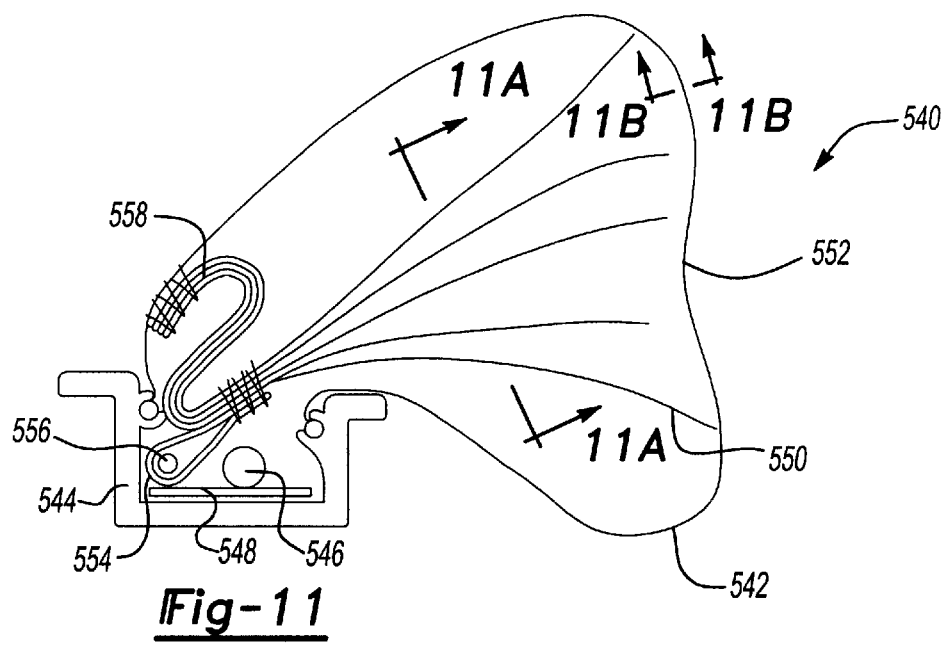
FIG. 11 illustrates a sectional view of an air bag system having an air bag, a tether element, and a moveable member.
Figure 11A:
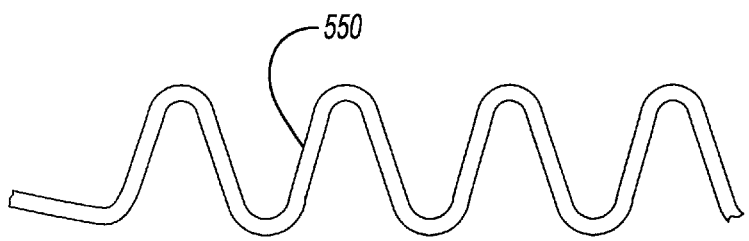
FIG. 11(b) illustrates a sectional view of the attachment of the tether element of FIG. 11 to the air bag of FIG. 11 taken along line 11B—11B.
Figure 11B:
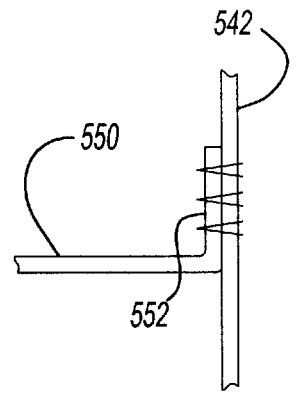

If desired, a tether element may be attached to an air bag, another tether element or both and the tether elements may be pleated or folded. Referring to FIGS. 11, and 11(a–b), there is illustrated an air bag system 540 having an air bag 542, a housing 544, a gas emitting inflator 546, a moveable member 548, and a tether element 550. The tether element 550 is configured to define a panel structure that is substantially triangular in shape when the air bag 542 is inflated and the tether element 550 includes an edge 552 of the triangular shape that is attached (e.g. stitched) in an elongated manner to a portion of the air bag 542 as best seen in FIG. 11(b). The first tether element 550 is pleated accordion-like as shown in FIG. 11(a). The tether element 550 includes a loop 554 releasably fastened to a rod 556 of the moveable member 548. Furthermore, the tether element 550 includes a base portion 558 sewn to a portion of the air bag 542 for providing a second lesser degree of restraint upon the air bag 542 when the moveable member 548 deploys and the loop 554 is released to further extend the tether element 550.

Gas Flow Passages

Consistent with the above, in other embodiments of the invention, gas flow passages may be employed in the air bag system for fluid venting, aspiration or other transport. A moveable member akin to those discussed in the foregoing is employed to controllably open and close the passages.

Referring to FIGS. 12(a)–12(d), there is illustrated an air bag system 600 having a gas emitting inflator 602, a housing 604, an air bag 606, a tether element 608, a rotatable lever arm 610, and a moveable member 612. All of these elements are substantially identical or similar to previously discussed elements of the air bag system. Additionally, however, the housing 604 includes a first gas flow passage 620 and the moveable member 612 includes a second gas flow passage 622.

In operation, the moveable member 612 is initially in a first position such that the lever arm 610 is securing a rod 624 attached to the tether element 608 between the arm 610 and a flange 626 of the housing 604. The moveable member 612 is thus blocking the first gas flow passage 620. Upon deployment, the moveable member 612 is translated as previously described for aligning the second opening 622 with the first opening 620 and allowing a flange 628 to move out of abutting contact with the member 612 and through the opening 620. The lever arm 610 rotates and releases the rod 624 and tether element 608. As the air bag 606 inflates, additional gas is aspirated through the openings 620, 622 from outside the housing and into the bag 606. More specifically, gas being released from the gas emitting inflator 602 travels past the member 610 creating a low pressure zone behind the member 610 which in turn pulls gas through the opening 620 into the bag 606.

In an alternative embodiment, and referring to FIGS. 13(a) and 13(b), there is illustrated an air bag system 640 that is substantially similar to the system 30 of FIGS. 2(a)–2(d) with the exception that the housing 32 includes another opening 642 for venting gas. Advantageously, as seen in FIG. 13(a), access to the opening 642 is initially inhibited by the tether element 40, which may be designed to substantially cover the opening 642 prior to air bag deployment. Once the air bag 42 is deployed, as seen in FIG.

13(b), the tether element 40 may continue to inhibit access to the opening 642 until the moveable member 36 releases the tether element 40 thus causing a time lag for venting the air bag 42. Timing of the release of the tether element 40 may be controlled by controlling the time at which the moveable member 36 is deployed or by controlling the length of the rod 62 that releases the tether element 40.

Figure 14A:
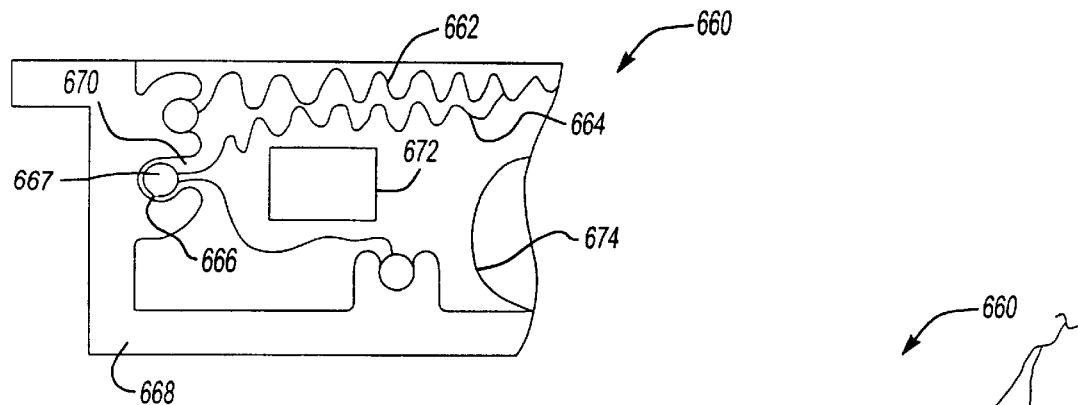
FIGS. 14(a)–14(b) illustrate a side sectional view of a portion of an air bag system having a selectively releasable tether element and an opening wherein the tether element is respectively in an unreleased and released state.
Figure 14B:
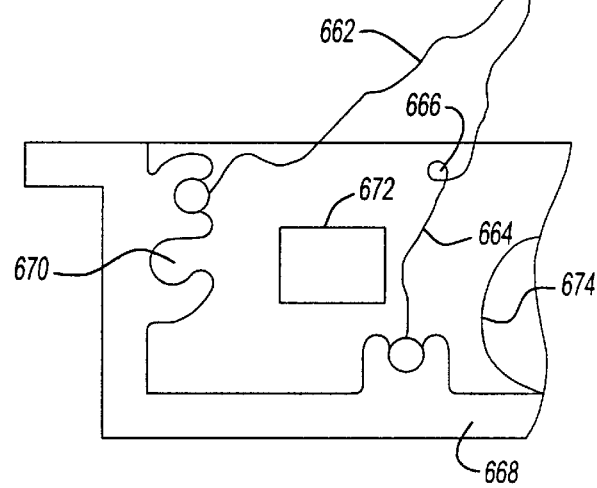

Referring to FIGS. 14(a)–14(b), there is illustrated an air bag system 660 having an air bag 662 attached to a tether element 664, which is attached to a pin 667. As shown, the housing 668 has a cavity 670 for releasably receiving the pin 667, and a venting opening 672. Upon deployment of the air bag 662, as seen in FIG. 14(b), a gas emitting inflator 674 releases gas into the air bag 662 as the opening 672 vents gas. When the movable member is actuated so that the tether loop 666 is released from the pin 667, the tether 664 extends blocking the gas escape path through the vent opening 672.

Figure 15A:
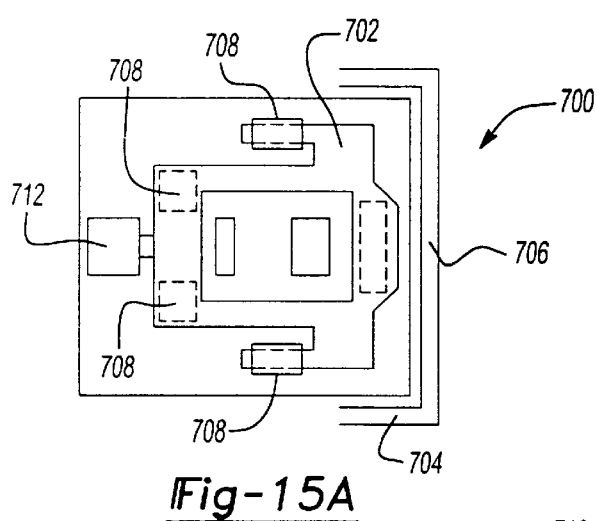
FIGS. 15(a)–15(b) illustrate a top view of a portion of an air bag system with a moveable member and a moveable housing.
Figure 15B:
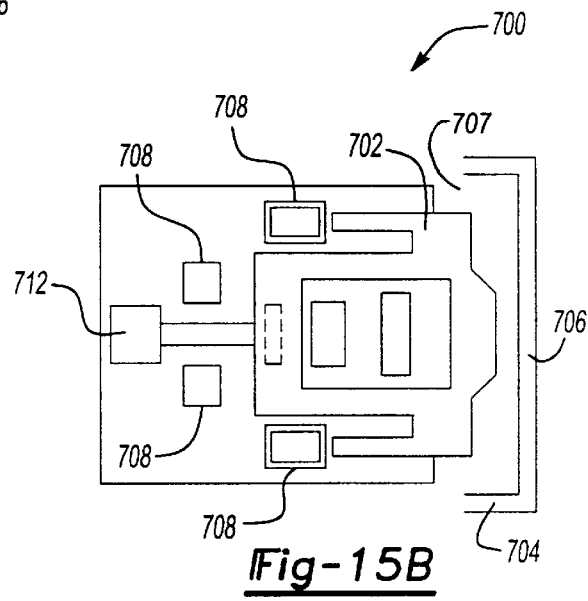

Referring to FIGS. 15(a) and 15(b), there is illustrated an air bag system 700 having a moveable member 702 similar to the member 36 of FIGS. 2(a)–2(b). The system 700 also includes a housing 704 with a wall 706 that can be translated to provide a gas escape path 707. Upon deployment of the air bag, as in FIG. 15(b), the moveable member 702 is actuated by an actuator 712 such that the moveable member 702 abuts and translates the wall 706 of the housing 704 thereby opening the openings 708 and providing a gas escape path 707 to outside atmosphere.

Openings in the moveable member and the housing for venting or aspirating gas may have a variety of configurations. Preferably, the housing and the moveable member each include an opening such that the openings may be selectively at least partially aligned to vent gas. The opening of the moveable member may fully or partially align with the opening of the housing to provide a first level of venting prior to actuation of the moveable member and may align to a greater or lesser degree do after actuation to provide a greater or lesser amount of venting thereby fine tuning the venting of the air bag system.

Figure 15C:
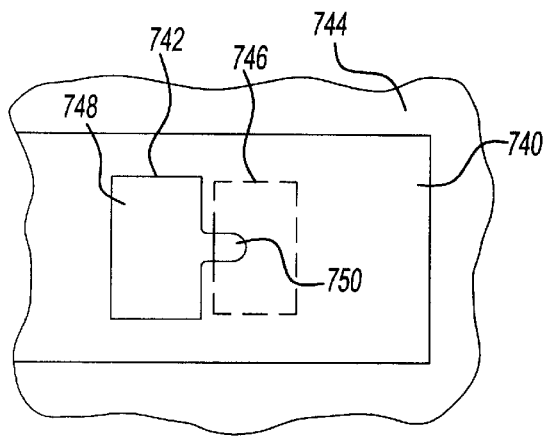
FIGS. 15(c)–15(d) illustrate top views of an opening in a housing and an opening in a moveable member.
Figure 15D:
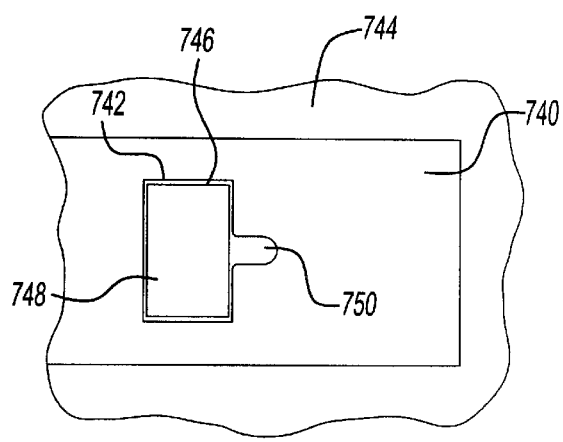

Referring to FIGS. 15(c)–15(d), there is illustrated a generally planar portion of a moveable member 740 having a first opening 742 and a portion of an air bag housing 744 having a second opening 746. The first opening 742 includes a rectangular portion 748 adjoining a substantially smaller channel portion 750. The second opening 746 is generally rectangular. Prior to actuation of the moveable member 740, the second opening 746 is substantially aligned with either the channel portion 750 or rectangular portion 748 of the first opening 742 for a first level of venting. Upon actuation of the moveable member 740, the first opening 742 moves to align whichever of the portions 748, 750 that was previously not aligned and move whichever portion 748, 750 was aligned out of alignment for a second higher level of venting.

Figure 15E:
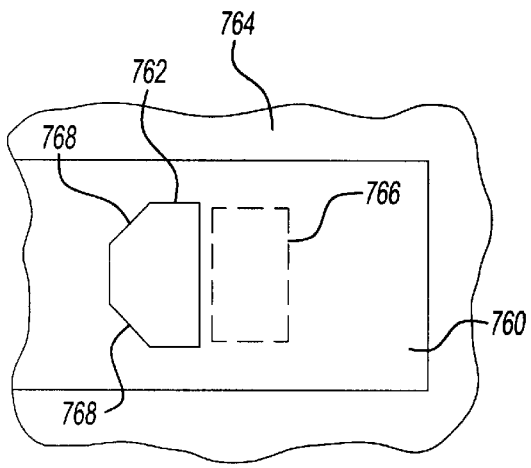
FIGS. 15(e)–15(f) illustrate top views of an opening in a housing and an opening in a moveable member.
Figure 15F:
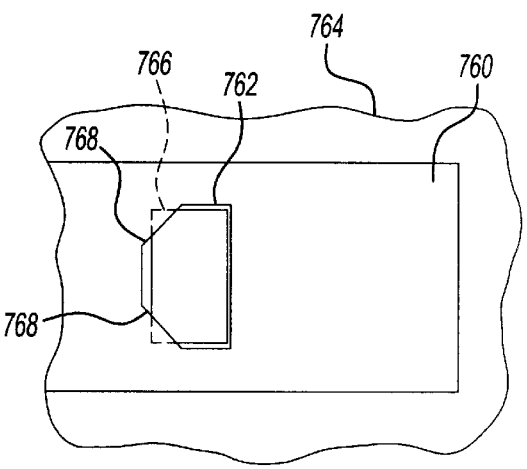

Referring to FIGS. 15(e)–15(f), there is illustrated a generally planar portion of a moveable member 760 having a first opening 762 and a portion of an air bag housing 764 having a second opening 766. The first opening 762 is generally rectangular with a pair of chamfered corners 768. The second opening 768 is generally rectangular. Actuation of the member 760 can align the openings 762, 766 or move the first opening 762 out of alignment with the second opening 768. The corners 768 can be chamfered as much as desired for restricting the amount of alignment possible for the openings 762, 766 thereby restricting the amount of the venting possible.

Figure 15G:
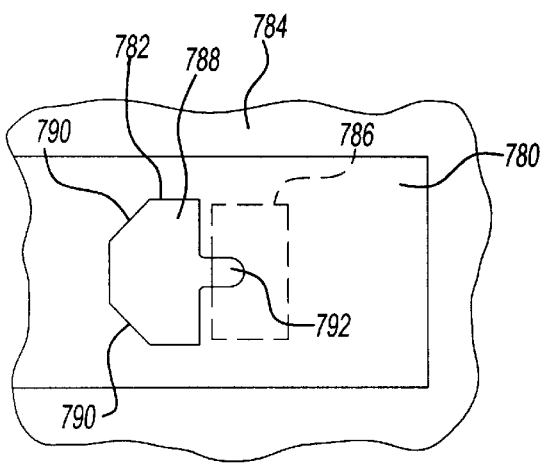
FIGS. 15(g)–15(h) illustrate top views of an opening in a housing and an opening in a moveable member.
Figure 15H:
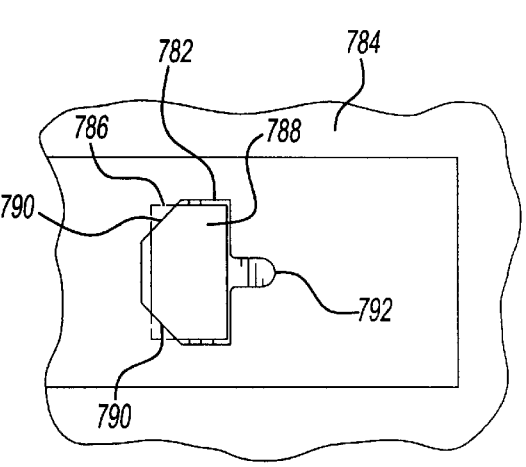

Referring to FIGS. 15(g)–15(h) there is illustrated a generally planar portion of a moveable member 780 having a first opening 782 and a portion of an air bag housing 784 having a second opening 786. The first opening 782 includes a rectangular portion 788 chamfered corners 790 and an adjoining substantially smaller channel portion 792. The second opening 786 is generally rectangular. Prior to actuation of the moveable member 780, the second opening 786 is substantially aligned with either the channel portion 792 or the rectangular portion 788 of the first opening 782 for a first level of venting. Upon actuation of the moveable member 780, the second rectangular opening 786 aligns with whichever of the portions 788, 792 of the first opening 782 that was not previously aligned for a second higher or lower level of venting. The corners 790 can be chamfered as much as desired for restricting the amount of alignment (and, in turn, venting) possible for the openings 782, 786.

Gas Flow Passage/Gas Flow Director Combination

Figure 16A:
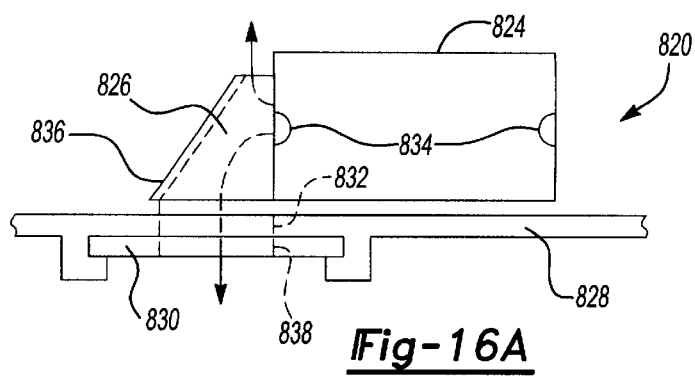
FIGS. 16(a)–16(b) illustrate side views of a venting system with a gas director.
Figure 16B:
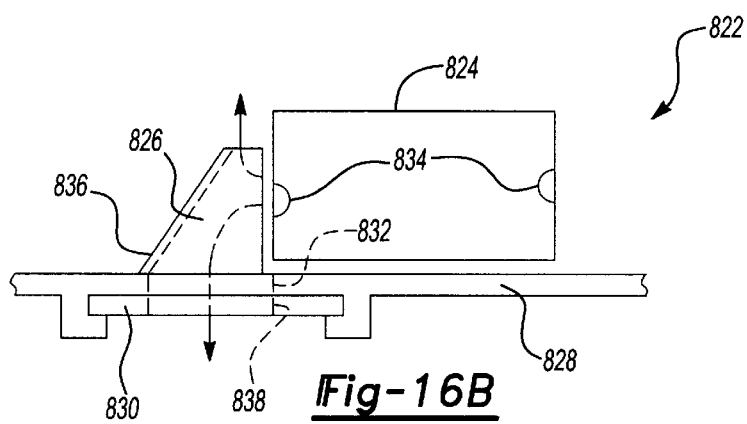

The air bag system of the present invention may include a gas director for selectively guiding gas from a gas emitting inflator toward or away from a gas flow opening. Referring to FIGS. 16(a)–16(b), there is illustrated an air bag system 820, 822 having an inflator 824, a gas director 826, a housing 828 and a moveable member 830. The housing 828 includes a gas flow opening 832. The inflator 824 includes a canister having a pair of outlets 834 for emitting gas. The gas director 826 includes a panel 836 that is disposed at an angle with respect to the housing 828. The only difference between the system 820 and the system 822 is that in FIG. 16(a), the director 826 is attached to the inflator 824 and, in FIG. 16(b), the director 828 is attached to the housing 828. The moveable member 830 is translatable between at least a first position and a second position and includes an opening 838. When the moveable member 830 is in the first position, as in FIGS. 16(a)–16(b), the gas flow opening 832 is aligned with the opening 838 as the angled panel 836 of the gas director 826 assists in guiding gas that escapes from the inflator 824 through the passage ways 832, 838 for greater venting. When the moveable member 830 is in the second position, (not shown), the member 830 at least partially obstructs the gas flow opening 832 of the housing 828 such that gas from the inflator 824 is inhibited from escaping through the opening 832.

Figure 16C:
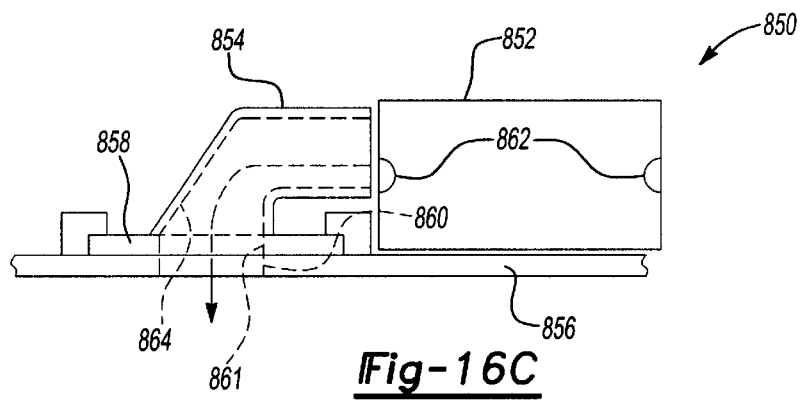
FIGS. 16(c)–16(d) illustrate side views of another venting system with a gas director.
Figure 16D:
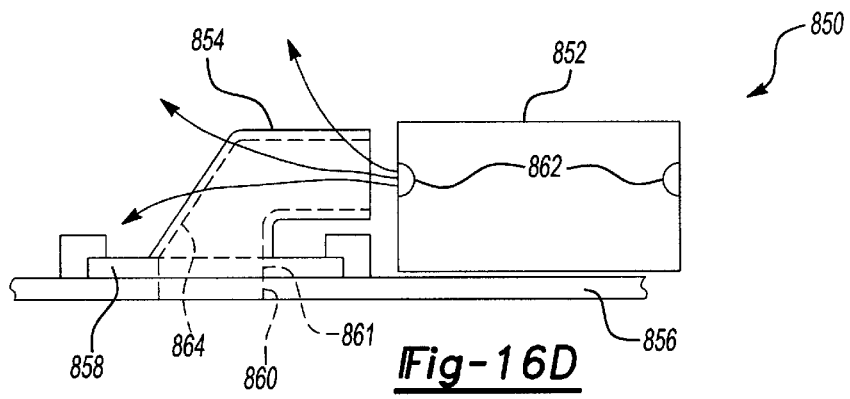

Referring to FIG. 16(c)–16(d), there is illustrated an air bag system 850 having an inflator 852, a gas director 854, a housing 856 and a moveable member 858. The moveable member 858 and the housing 856 each respectively include a gas flow opening 860, 861. The inflator 852 includes a canister having a pair of outlets 862 for emitting gas. The gas director 854 is a tubular structure attached to the moveable member 858 and includes a passage 864 defined therethrough. The moveable member 858 is translatable between at least a first position and a second position. When the moveable member 858 is in the first position, as in FIG. 16(c), the passage 864 of the gas director 854 is aligned with one of the outlets 862 of the inflator 852 and with the gas flow opening 860 of the housing 856 such that a substantial amount of gas is channeled from the inflator 852, through the passage 864 of the gas director 854 and out of the gas flow openings 860, 861 of the housing 856 and member 858. When the moveable member 858 is in the second position, as in FIG. 16(d), the gas director 854 plays little or no part in guiding gas from the inflator 852.

Moveable Member Alternative Operation

The air bag system of the present invention may also include a moveable member that is actuated by the pressure in an inflator that is also used to inflate the air bag itself. This may be done in airbag systems containing one or more inflators. Referring to 17(a), there is illustrated an air bag system 900 having an inflator 902, a moveable member 904 and a housing 906. The inflator 902 has a pair of outlets 908 and the moveable member 904 includes a wall portion 910 that opposes one of the outlets 908. Upon deployment of an air bag, gas is expelled from the outlet 908 of the inflator 902 toward the opposing wall portion 910 of the moveable member 904 thereby translating the member 904 relative to the housing 906.

Figure 17A:
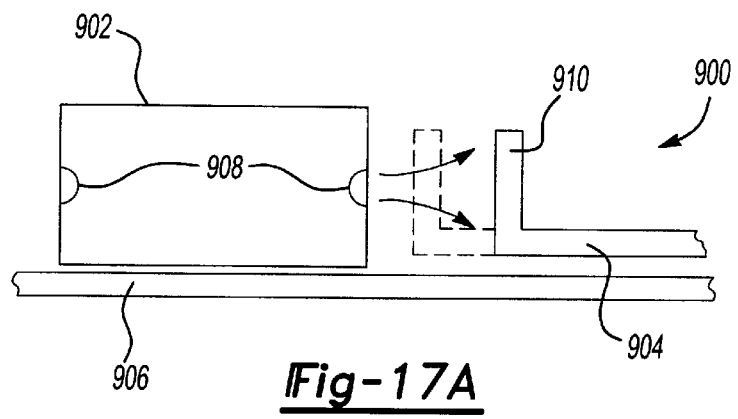
FIG. 17(a) illustrates a portion of an air bag system having an inflator translating a moveable member.
Figure 17B:
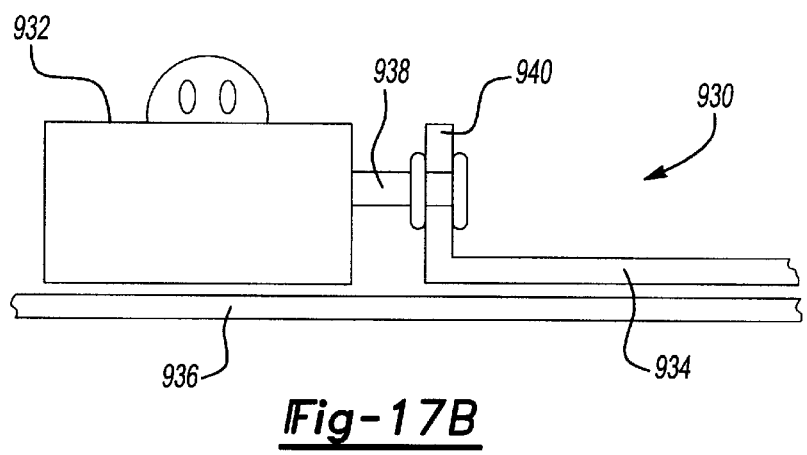
FIGS. 17(b)–17(c) illustrates another portion of an air bag system having an inflator translating a moveable member.
Figure 17C:
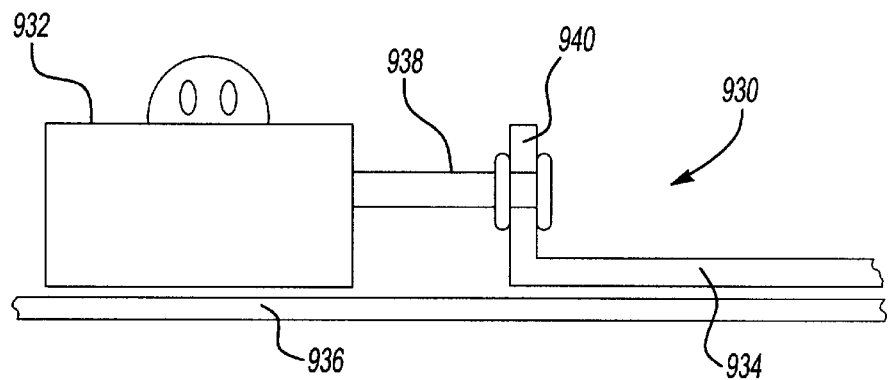

Referring to FIGS. 17(b)–17(c), there is illustrated an air bag system 930 having an inflator 932, a moveable member 934 and a housing 936. The inflator 932 includes a rod 938 attached to a wall portion 940 of the moveable member 934.

Upon deployment of an air bag, gas is expelled from the inflator 932, and additionally, pressure within the inflator 932 pushes the rod 938 and the moveable member 934 away from the inflator 932 thereby translating the moveable member 934 relative to the housing 936. This may be done in an airbag system containing one or more inflators.

Alternatives

Various changes may be made to the embodiments shown above to form alternative embodiments of the invention. Components of the air bag systems such as moveable members, release mechanisms, actuators and the like or portions of these components may be separate or integrally formed. Components disclosed in one of the embodiments may be utilized or interchanged with components of other disclosed embodiments.

The moveable members may be selectively deployed based upon signals of a single sensor or multiple sensors. The sensors may be designed to sense a variety of different conditions such as impact, yaw, braking, passenger position and the like. Based upon one or more of the conditions sensed, the sensor may signal full deployment of the air bag (i.e., deployment of the air bag wherein the moveable member also actuates to release a tether element, close a high pressure vent or both), partial deployment of the air bag (i.e., deployment of the air bag wherein the moveable member is not actuated thereby retaining a tether element, maintaining high pressure vents open or both) or non-deployment of the air bag.

Additionally, the sensors may signal the deployment of the moveable member and an associated air bag sequentially or at the same time as desired and their deployment may be dependent or independent of each other.

Multiple types of air bags may take advantage of the concepts and components disclosed herein. The air bags may be side impact air bags, roof or A-pillar mounted air bags or the like.

Although, the moveable member is shown as translating along a single axis, it is contemplated that motion of the member may be along multiple axes in multiple directions.

It should be understood that the invention is not limited to the exact embodiment or construction which has been illustrated and described but that various changes may be made without departing from the spirit and the scope of the invention.

What is claimed is:

1. An air bag system comprising:
   a gas emitting inflator for emitting inflation gas, said inflator in signaling communication with a device for sensing a first predetermined condition;
   an air bag in fluid communication with said inflator for receiving said inflation gas from said inflator to inflate said air bag to a deployed state upon the occurrence of said first predetermined condition;
   a housing substantially surrounding said air bag and said inflator prior to inflation of said air bag, said housing including a vent opening;
   a profile restraining tether element attached to a portion of said air bag;
   a moveable member that is moveable from a first position to a second position, said member including an opening in alignment with said vent opening of said housing when said moveable member is in its first position and out of alignment when said moveable member is in said second position;
   an actuator capable of selectively actuating said moveable member from said first position to said second position; and
   a release mechanism having a rotatable member supported by said moveable member prior to actuation of said member, said rotatable member rotating to release said tether element upon actuation of said moveable member.

2. An air bag system as in claim 1, wherein said actuator is in signaling communication with a second sensing device, said second sensing device capable of sending signals to said actuator to assist in determining when said actuator actuates said moveable member based upon a second predetermined condition, and said first sensing device and said second sensing device are integrated into a single system.

3. An air bag system as in claim 1, wherein said actuator is in signaling communication with a second sensing device, said second sensing device capable of sending signals to said actuator to assist in determining when said actuator actuates said moveable member based upon a second predetermined condition, and said first sensing device and said second sensing device are separate from each other.

4. An air bag system as in claim 1, wherein said housing includes an opening adjacent said rotatable member and said rotatable member rotates to partially cover said opening adjacent said rotatable member such that said opening aspirates gas from the surrounding environment.

5. An air bag system as in claim 1, wherein said second predetermined condition is occupant positioning.

6. An air bag system comprising:
   a gas emitting inflator for emitting inflation gas, said inflator in signaling communication with a device for sensing a first predetermined condition;
   an air bag in fluid communication with said inflator for receiving said inflation gas from said inflator to inflate said air bag to a deployed state upon the occurrence of said first predetermined condition;
   a housing substantially surrounding said air bag and said inflator prior to inflation of said air bag, said housing including a vent opening and a rod;
   a profile restraining tether element attached to a portion of said air bag and looped about said rod of said housing;
   a scraper;
   a moveable member in driving relationship with said scraper, said moveable member being moveable from a first position to a second position, said member including a member opening; and
   an actuator capable of selectively actuating said moveable member from said first position to said second position;
   wherein said tether element is releasable from said rod by said scraper upon actuation of said moveable member.

7. An air bag system as in claim 6, wherein said actuator is in signaling communication with a second sensing device, said second sensing device capable of sending signals to said actuator to assist in determining when said actuator actuates said moveable member based upon a second predetermined condition, and said first sensing device and said second sensing device are integrated into a single system.

8. An air bag system as in claim 6, wherein said actuator is in signaling communication with a second sensing device, said second sensing device capable of sending signals to said actuator to assist in determining when said actuator actuates said moveable member based upon a second predetermined condition, and said first sensing device and said second sensing device are separate from each other.

9. An air bag system as in claim 6, wherein said second predetermined condition is occupant positioning.

10. An air bag system as in claim 6, wherein said scraper includes an annular retaining wall disposed on a free end of said rod to prevent releasing of said tether element prior to actuation of said moveable member.

11. An air bag system as in claim 10, wherein said scraper further includes a hook portion attached to said retaining wall at one end and operable to pull said tether element off said rod upon actuation of said moveable member.

12. An air bag system as in claim 10, wherein said scraper includes a scraping element mounted on said rod and disposed between said housing and said tether element, said scraping element operatively attached to said retaining wall of said scraper whereby upon actuation of said moveable member said scraping element releases said tether element from said rod.

13. An air bag system as in claim 6, wherein said moveable member vent opening is partially aligned with said housing vent opening when said moveable member is in said first position and said housing vent opening is substantially closed when said moveable member is in said second position.

14. An air bag system as in claim 6, wherein said moveable member vent opening is substantially aligned with said housing vent opening when said moveable member is in said first position and said housing vent opening is partially closed when said moveable member is in said second position.

15. An air bag system as in claim 6, wherein said moveable member vent opening is partially aligned with said housing vent opening when said moveable member is in said first position and said housing vent opening is partially closed when said moveable member is in said second position.

16. An air bag system as in claim 6, wherein said tether element is a vertically-oriented panel when said air bag is inflated.

17. An air bag system as in claim 6, wherein said tether element is attached to and disposed on an exterior side of said air bag.

18. An air bag system as in claim 6, wherein said gas emitting inflator is capable of emitting more than one level of inflation gas to the air bag.

19. An air bag system comprising:
a gas emitting inflator for emitting inflation gas, said inflator in signaling communication with a device for sensing a first predetermined condition;
an air bag in fluid communication with said inflator for receiving said inflation gas from said inflator to inflate said air bag to a deployed state upon the occurrence of said first predetermined condition;
a housing substantially surrounding said air bag and said inflator prior to inflation of said air bag, said housing including a vent opening;
a moveable member that is moveable from a first position to a second position, said member including an opening with a first portion in alignment with said vent opening of said housing when said moveable member is in its first position and a second portion in alignment with said vent opening of said housing when said housing is in said second position;
a profile restraining tether element attached to a portion of said air bag and releaseably retained by said moveable member;
an actuator capable of selectively actuating said Tolerable remember from said first position to said second position; and
a scraper wherein said tether element is releaseable from said moveable member by said scraper upon actuation of said moveable member.

20. An air bag system as in claim 19, wherein said actuator is in signaling communication with a second sensing device, said second sensing device capable of sending signals to said actuator to assist in determining when said actuator actuates said moveable member based upon a second predetermined condition, and said first sensing device and said second sensing device are integrated into a single system.

21. An air bag system as in claim 19, wherein said actuator is in signaling communication with a second sensing device, said second sensing device capable of sending signals to said actuator to assist in determining when said actuator actuates said moveable member based upon a second predetermined condition, and said first sensing device and said second sensing device are separate from each other.

22. An air bag system as in claim 19, wherein said second predetermined condition is occupant positioning.

23. An air bag system as in claim 19, wherein said moveable member includes a rod about which said tether element is releaseably retained and wherein said scraper is mounted on said rod between said moveable member and said tether element and operatively attached to said housing whereby upon actuation of said moveable member said scraping element releases said tether element from said rod.

24. An air bag system as in claim 19, wherein said tether element is a vertically-oriented panel when said air bag is inflated.

25. An air bag system as in claim 19, wherein said tether element is attached to and disposed on an exterior side of said air bag.

26. An air bag system comprising:
a gas emitting inflator for emitting inflation gas, said inflator in signaling communication with a device for sensing a first predetermined condition;
an air bag in fluid communication with said inflator for receiving said inflation gas from said inflator to inflate said air bag to a deployed state upon the occurrence of said first predetermined condition;
a housing substantially surrounding said air bag and said inflator prior to inflation of said air bag, said housing including a vent opening;
a moveable member that is moveable from a first position to a second position, said member including an opening in alignment with said vent opening of said housing when said moveable member is in its first position and out of alignment when said housing is in said second position;
an actuator capable of selectively actuating said moveable member from said first position to said second position;

a profile restraining tether element attached to a portion of said air bag and releaseably retained by a portion of said air bag system whereupon actuation of said moveable member, said tether element is released; and a gas director adjacent said opening of said moveable member, said gas director guiding gas from said inflator through said opening in said moveable member and said vent opening in said housing when said moveable member is in a position selected from said first position and said second position.

27. An air bag system as in claim 26, wherein said actuator is in signaling communication with a second sensing device, said second sensing device capable of sending signals to said actuator to assist in determining when said actuator actuates said moveable member based upon a second predetermined condition, and said first sensing device and said second sensing device are integrated into a single system.

28. An air bag system as in claim 26, wherein said actuator is in signaling communication with a second sensing device, said second sensing device capable of sending signals to said actuator to assist in determining when said actuator actuates said moveable member based upon a second predetermined condition, and said first sensing device and said second sensing device are separate from each other.

29. An air bag system as in claim 26, wherein said second predetermined condition is occupant positioning.

30. An air bag system as in claim 26, wherein said gas director is attached to said inflator.

31. An air bag system as in claim 26, wherein said gas director is attached to said housing.

32. An air bag system as in claim 26, wherein said gas director is attached to said moveable member.

33. An air bag system as in claim 26, wherein said portion of said air bag system to which said tether element is releaseably retained by is said moveable member.

34. An air bag system as in claim 26, wherein said portion of said air bag system to which said tether element is releaseably retained by is said housing.

* * * * *